(12) United States Patent
Hokoda et al.

(10) Patent No.: US 8,556,479 B2
(45) Date of Patent: Oct. 15, 2013

(54) VEHICLE LIGHTING FITTING AND METHOD FOR MANUFACTURING VEHICLE LIGHTING FITTING

(75) Inventors: Kazuaki Hokoda, Tokyo (JP); Yoshihiro Zaitsu, Tokyo (JP); Tatsuya Umeyama, Tokyo (JP); Takashi Akabane, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 103 days.

(21) Appl. No.: 13/168,065

(22) Filed: Jun. 24, 2011

(65) Prior Publication Data

US 2011/0317443 A1 Dec. 29, 2011

(30) Foreign Application Priority Data

Jun. 24, 2010 (JP) ................................. 2010-143811
Jun. 24, 2010 (JP) ................................. 2010-143812
Jul. 22, 2010 (JP) ................................. 2010-165186

(51) Int. Cl.
*F21V 1/00* (2006.01)
(52) U.S. Cl.
USPC ........... 362/509; 362/510; 362/516; 362/520; 362/546; 362/806; 156/272.8; 40/546

(58) Field of Classification Search
USPC ......... 362/507, 509, 510, 516, 520, 546, 806, 362/812; 156/272.8; 524/495; 40/546
See application file for complete search history.

(56) References Cited

U.S. PATENT DOCUMENTS 5,909,956 A * 6/1999 Broyles .......................... 362/473
2006/0077681 A1* 4/2006 Ikeda et al. .................... 362/510

FOREIGN PATENT DOCUMENTS

JP 2006-114383 A 4/2006

* cited by examiner

*Primary Examiner* — Stephen F Husar
*Assistant Examiner* — Meghan Dunwiddie
(74) *Attorney, Agent, or Firm* — Kenealy Vaidya LLP

(57) ABSTRACT

A vehicle lighting fitting can include a housing including an opening end portion, a lens, an outer peripheral portion of which is laser-welded to the opening end portion to define a lighting chamber, and a decorative member disposed in the lighting chamber. The resin decorative member can include an outer peripheral portion on which a joint portion and a non-joint portion are alternately formed along a perimeter thereof, wherein the joint portion of the decorative member and the opening end portion of the housing are laser-welded in a state in which clearances are maintained between the non-joint portion of the decorative member and the housing, and between the lens and the housing.

12 Claims, 23 Drawing Sheets

RELATED ART

VEHICLE LIGHTING FITTING AND METHOD FOR MANUFACTURING VEHICLE LIGHTING FITTING

This application claims the priority benefit under 35 U.S.C. §119 of Japanese Patent Application Nos. 2010-143811 and 2010-143812 which were both filed on Jun. 24, 2010 and Japanese Patent Application No. 2010-165186 which was filed on Jul. 22, 2010, and which are all hereby incorporated in their entirety by reference.

BACKGROUND

1. Field

The presently disclosed subject matter relates to a vehicle lighting fitting and a manufacturing method of a vehicle lighting fitting. The disclosed subject matter particularly relates to a vehicle lighting fitting which can prevent or reduce problems such as, due to friction which occurs between a housing and lens, and a decorative member, the lens may be damaged and exerts an influence on visual appearance, and wherein a frictional sound may be caused.

2. Description of the Related Art

As illustrated in FIG. 29, there has been conventionally known a vehicle lighting fitting 400 which is constructed by laser-welding an opening end portion 411 of a housing 410 and an outer peripheral portion 421 of a lens 420, and an outer peripheral portion 431 of a decorative member 430 (for example, refer to Japanese Patent Application Laid-Open No. 2006-114383).

SUMMARY

However, the vehicle lighting fitting 400 of the above described configuration includes the housing 410 and the lens 420, and the decorative member 430 which are constructed to be in close contact with one another over entire peripheries thereof, even in spots other than the laser-welded spots. Therefore, there is a fear that friction is produced in the close contact portions by the influence of vibrations or the like at the time of traveling of the vehicle, resulting in problems in which the lens 420 is damaged and exerts an influence on visual appearance, and/or a frictional sound occurs.

The presently disclosed subject matter is made in view of the above and other circumstances, and is directed to a vehicle lighting fitting which can prevent or reduce problems due to friction which may occur between a housing and a lens, and a decorative member. Moreover, the vehicle lighting fitting can avoid frictional damage to the lens which in turn might exert an influence on visual appearance, and can also avoid or prevent a frictional sound from occurring due to the above-noted friction. A method for manufacturing such a vehicle lighting fitting is also disclosed.

According to one aspect of the presently disclosed subject matter a vehicle lighting fitting can include: a resin housing including an opening end portion; a resin lens, an outer peripheral portion of which is laser-welded to the opening end portion to configure a lighting chamber; and a resin decorative member disposed in the lighting chamber, the resin decorative member including an outer peripheral portion on which a joint portion and a non-joint portion alternately formed in a perimeter direction, wherein the joint portion of the resin decorative member and the opening end portion of the resin housing are laser-welded in a state in which clearances are kept (or maintained) between the non-joint portion of the resin decorative member and the resin housing, and between the resin lens and the resin housing.

According to the above aspect of the presently disclosed subject matter, by the action of clearances between the non-joint portion of the resin decorative member and the resin lens, and the resin housing, the resin lens and the resin housing, and the spots which are not laser-welded of the resin decorative member are configured not to be in close contact with one another. Therefore, friction which might otherwise occur between the housing and the lens, and the decorative member can be prevented or reduced. Thereby, the vehicle lighting fitting, which can prevent or reduce the problems due to the friction in which the lens is damaged to an extent that exerts an influence on the visual appearance and/or a friction sound occurs, can be provided.

The non-joint portion can be a step portion which is recessed to a side of the lighting chamber.

According to the above aspect of the presently disclosed subject matter, by the action of the clearances (step portions recessed to the lighting chamber side) between the non-joint portion of the resin decorative member, and the resin lens and the resin housing, the resin lens and the resin housing, and the spots which are not laser-welded of the resin decorative member are configured to not be in close contact with each other. Therefore, the friction which occurs between the housing and the lens, and the decorative member can be prevented or reduced. Thereby, the vehicle lighting fitting can be provided which can prevent or reduce the problems in which the lens is damaged to an extent that exerts an influence on visual appearance, and in which a friction sound occurs.

The laser welding can be laser welding by a laser light from a laser head portion held by a robot arm, or a laser light from a galvano scan optical system fixed to a predetermined frame.

The above aspect is an illustration of laser welding. Accordingly, other laser welding methods and apparatus can be used.

Another aspect of the presently disclosed subject matter is a method for manufacturing a vehicle lighting fitting by using laser welding, in which the method can include: a first holding step of pressing a decorative member including an outer peripheral portion on which a joint portion including a transparent portion and a non-joint portion alternately formed in a perimeter direction, and a housing including an opening end portion, and holding the decorative member and the housing in a state in which a clearance is kept between the non-joint portion of the decorative member and the housing, and in a state in which the transparent portion of the decorative member and the opening end portion of the housing abut on each other; a first scanning step of scanning a laser light so that the laser light transmits through the transparent portion of the decorative member, the opening end portion of the housing on which the transparent portion of the decorative member abuts is irradiated with the laser light, and the housing and the decorative member which abuts on the housing are fused and joined; a second holding step of pressing a lens and the housing, and holding the lens and the housing in a state in which a clearance between the non-joint portion of the decorative member and the lens is kept, and in a state in which an outer peripheral portion of the lens and the opening end portion of the housing abut on each other; and a second scanning step of scanning a laser light so that the laser light transmits through the lens, the opening end portion of the housing on which the outer peripheral portion of the lens abuts is irradiated with the laser light, and the housing and the lens which abuts on the housing are fused and joined, wherein the transparent portion of the decorative member is a thermoplastic resin transparent portion having a transmission property to the laser light, the lens is a thermoplastic resin lens having a transmission property to the laser light, and the housing is a thermoplastic resin housing having an absorption property to the laser light.

The above aspect of the presently disclosed subject matter can provide a method for manufacturing a vehicle lighting fitting which can prevent or reduce friction which occurs between the housing and the lens, and the decorative member with the lens and the housing. Thus, the spots which are not laser-welded of the decorative member are not in close contact with one another (that is, the vehicle lighting fitting can prevent or reduce the problems in which, due to friction, the lens is damaged to an extent that exerts an influence on the visual appearance, and in which a friction sound may occur).

Another aspect of the presently disclosed subject matter is a vehicle lighting fitting which can include: a resin housing including an opening end portion; a resin lens, an outer peripheral portion of which is laser-welded to the opening end portion to configure a lighting chamber; and a resin decorative member disposed in the lighting chamber, wherein a plurality of recessed portions are formed in a perimeter direction of the opening end portion, on the opening end portion of the resin housing, a plurality of claw portions which are inserted in the plurality of recessed portions are formed in a perimeter direction of the outer peripheral portion, on an outer peripheral portion of the resin decorative member, the resin lens includes a plurality of pressing portions which press the plurality of claw portions to displace the plurality of claw portions to an inner side of the lighting chamber, the plurality of claw portions are pressed by the plurality of pressing portions to be displaced to the inner side of the lighting chamber and pressed against inner peripheral surfaces of the plurality of recessed portions, and the inner peripheral surfaces of the plurality of recessed portions and the plurality of claw portions which are pressed against the inner peripheral surfaces of the plurality of the recessed portions are laser-welded.

According to the above aspect of the presently disclosed subject matter, laser welding is applied in the state in which a plurality of claw portions are pressed by a plurality of pressing portions to be displaced to an inner side and pressed against the inner peripheral surfaces of the plurality of recessed portions, that is, laser welding is applied in the state in which the decorative member (a plurality of claw portions) are firmly held between the lens (a plurality of pressing portions) and the housing (the inner peripheral surfaces of the plurality of recessed portions). Therefore, as compared with the conventional art in which the housing and the lens, and the decorative member are simply laser-welded, the occurrence of friction among the respective components as a result that the components (the housing, the lens and the extension) of the vehicle lighting fitting relatively move can be prevented, or reduced. Thereby, the vehicle lighting fitting can be provided, which can prevent or reduce the problems that due to friction, the lens is damaged to an extent that exerts an influence on the visual appearance, and in which a friction sound may occur.

The laser welding can be laser welding by a laser light from a laser head portion held by a robot arm, or a laser light from a galvano scan optical system fixed to a predetermined frame.

The above aspect is an illustration of laser welding. Accordingly, other laser welding can be used.

Another aspect of the presently disclosed subject matter is a method for manufacturing a vehicle lighting fitting by using laser welding, that can include the steps of: inserting a plurality of transparent claw portions formed in a perimeter direction on an outer peripheral portion of a decorative member into a plurality of recessed portions formed in a perimeter direction on an opening end portion of a housing; pressing the housing and a lens including a plurality of pressing portions which press the plurality of claw portions to displace the plurality of claw portions to an inner side, causing an outer peripheral portion of the lens and the opening end portion of the housing to abut on each other, and pressing the plurality of claw portions by the plurality of pressing portions to displace the plurality of claw portions to the inner side to press the plurality of claw portions against inner peripheral surfaces of the plurality of recessed portions; and scanning a laser light so that a laser light transmits through the lens and the plurality of transparent claw portions, the opening end portion of the housing on which the lens abuts, and the inner peripheral surfaces of the plurality of recessed portions against which the plurality of transparent claw portions are pressed are irradiated with the laser light, and the opening end portion of the housing and the lens which abuts on the opening end portion, and the inner peripheral surfaces of the plurality of recessed portions and the plurality of claw portions which are pressed against the inner peripheral surfaces of the plurality of recessed portions are fused and joined, wherein the plurality of transparent claw portions are thermoplastic resin transparent portions having a transmission property to the laser light, the lens is a thermoplastic resin lens having a transmission property to the laser light, and the housing is a thermoplastic resin housing having an absorption property to the laser light.

According to the above aspect of the presently disclosed subject matter, a vehicle lighting fitting can be manufactured which can prevent or reduce the occurrence of friction among respective components, the friction occurring as a result that the components (the housing, the lens and the extension) of the vehicle lighting fitting move relative to each other, as compared with the conventional art in which the housing and the lens, and the decorative member are simply laser-welded (that is, the vehicle lighting fitting can prevent or reduce the problems that, due to the friction, the lens is damaged to an extent that exerts an influence on the visual appearance, and in which a friction sound may occur).

Further, according to the above aspect of the presently disclosed subject matter, the four sides of the decorative member can be substantially uniformly pressed by the action of a plurality of pressing portions. Therefore, positioning of the decorative member to the housing can be automatically performed. Further, the mounting posture of the extension can be controlled to be automatically a proper posture with respect to the vertical and lateral directions.

Further, according to the above aspect of the presently disclosed subject matter, by only performing positioning of the lens to the housing, positioning of the decorative member to the housing can be automatically performed (conventionally, in order to perform laser welding properly, both positioning of the lens to the decorative member and positioning of the housing to the decorative member have had to be properly performed).

Another aspect of the presently disclosed subject matter is a vehicle lighting fitting that can include: a resin housing including an opening end portion; a resin lens, an outer peripheral portion of which is laser-welded to the opening end portion to configure a lighting chamber; and a resin decorative member disposed in the lighting chamber, wherein on an inner side of the opening end portion of the resin housing, a plurality of joint portions are formed in a perimeter direction of the inner side of the opening end portion, and an outer peripheral portion of the resin decorative member and the plurality of joint portions are laser-welded.

According to the above aspect of the presently disclosed subject matter, the outer peripheral portion of the resin decorative member and a plurality of joint portions are laser-welded, and the spots other than the joint portions are not in contact with each other. Therefore, friction which occurs between the housing and the lens, and the decorative member can be prevented or reduced. Thereby, the vehicle lighting fitting can be constructed, which can prevent or reduce problems that, due to friction, damages the lens to an extent that exerts an influence on the visual appearance, and in which a friction sound may occur.

The plurality of joint portions can be formed at a position which is one step lower than the opening end portion.

According to the above aspect of the presently disclosed subject matter, the laser-welded spot of each of the joint portions of the housing and the outer peripheral portion of the decorative member can be covered with the opening end portion of the housing in side view. Therefore, the vehicle lighting fitting in which the laser-welded spot is not visually recognized from the side surface can be constructed.

An annular rib which includes an annular joint surface at a tip end can be formed on the outer peripheral portion of the resin lens, and the annular joint surface of the annular rib of the resin lens and each of the joint portions of the resin housing can be laser-welded, and the annular rib of the resin lens can be formed into a tapered shape which becomes narrower toward a base end from a tip end.

According to the above aspect of the presently disclosed subject matter, the laser-welded spot of the outer peripheral portion of the decorative member and each of the joint portions of the housing is covered with the annular rib of the lens in front view. Therefore, the vehicle lighting fitting with excellent visual appearance in which the laser-welded spot is not visually recognized from the front can be provided.

The laser welding can be accomplished by a laser light from a laser head portion held by a robot arm, or a laser light from a galvano scan optical system fixed to a predetermined frame.

The above aspect is an illustration of laser welding. Accordingly, other types of laser welding can also be used.

Another aspect of the presently disclosed subject matter is a method for manufacturing a vehicle lighting fitting by using laser welding, including a step of: causing a transparent portion formed on an outer peripheral portion of a decorative member, and a plurality of joint portions formed in a perimeter direction on an inside of an opening end portion of a housing to abut on each other, and holding an outer peripheral portion of the lens and the opening end portion of the housing in a state in which the outer peripheral portion and the opening end portion abut on each other; and scanning a laser light so that the laser light transmits through the lens and the transparent portion of the decorative member, the opening end portion of the housing on which the outer peripheral portion of the lens abuts, and a plurality of joint portions of the housing on which the transparent portion of the decorative member abuts are irradiated with the laser light, and the opening end portion of the housing and the outer peripheral portion of the lens which abuts on the opening end portion, and a plurality of abutting portions of the housing and the transparent portion of the decorative member which abuts on the plurality of abutting portions are fused and joined, wherein the transparent portion of the decorative member is a thermoplastic resin transparent portion having a transmission property to the laser light, the lens is a thermoplastic resin lens having a transmission property to the laser light, and the housing is a thermoplastic resin housing having an absorption property to the laser light.

According to the above aspect of the presently disclosed subject matter, a vehicle lighting fitting can prevent or reduce friction which occurs between the housing and the lens, and the decorative member. The spots other than the laser-welded spots of the outer peripheral portion of the resin decorative member and a plurality of joint portions are not in close contact with one another (that is, the vehicle lighting fitting can prevent or reduce the problems that, due to friction, the lens is damaged to an extent that exerts an influence on the visual appearance, and in which a friction sound may occur).

As described above, according to the presently disclosed subject matter, vehicle lighting fittings, which can prevent or reduce problems such as those that occur due to friction in which the lens is damaged to an extent that exerts an influence on the visual appearance, and in which a friction sound may occur. Methods for manufacturing the vehicle lighting fitting are also disclosed. It should be noted that various features of each of the above described embodiments of a lighting fitting can be used interchangeably and in combination with each other. Moreover, each of the unique features from each embodiment can be used in each of the other embodiments without departing from the spirit and scope of the disclosed subject matter. Likewise, each of the method features of the above described embodiments of a lighting fitting method can be used interchangeably and in combination with each other. Furthermore, the specific sequential (or non-sequential) order of steps or method features can be rearranged without departing from the spirit and scope of the disclosed subject matter.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Hereinafter, a vehicle lighting fitting 110 according to a first embodiment of the presently disclosed subject matter will be described with reference to the drawings.

Figure 1:
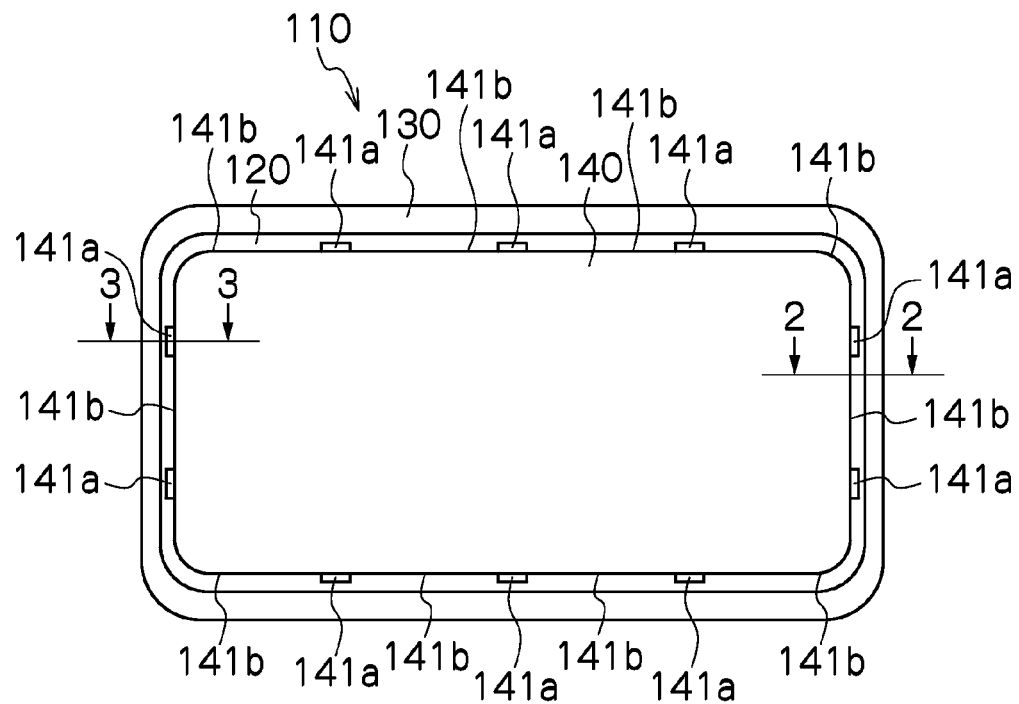
FIG. 1 is a front view of a vehicle lighting fitting according to a first embodiment of the presently disclosed subject matter.
Figure 2:
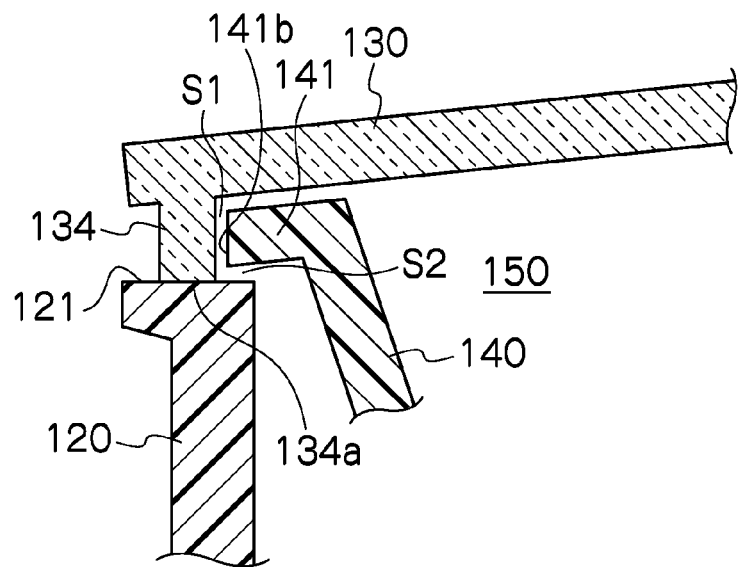
FIG. 2 is a sectional view taken along line 2-2 of the vehicle lighting fitting illustrated in FIG. 1.
Figure 3:
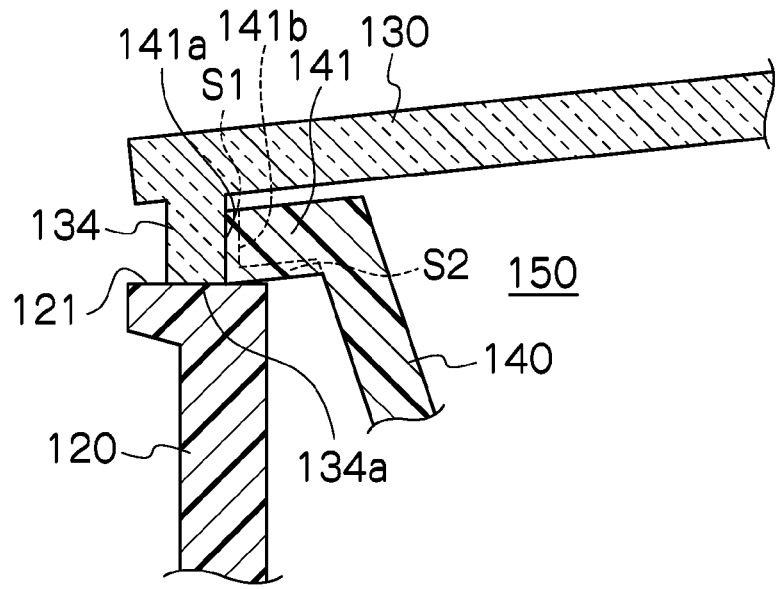
FIG. 3 is a sectional view taken along line 3-3 of the vehicle lighting fitting illustrated in FIG. 1.

The vehicle lighting fitting 110 of the present embodiment is applied to, for example, vehicle lighting fittings such as rear combination lamps or the like which are respectively disposed at both left and right sides of a vehicle rear portion. The vehicle lighting fitting 110 includes a housing 120, a lens 130 and an extension 140, as illustrated in FIGS. 1 to 3. Of course, the disclosed subject matter can be incorporated into other types of lamps and fixtures, including headlights, turning lights, street lamps, decorative fixtures, and room lighting.

Figure 4:
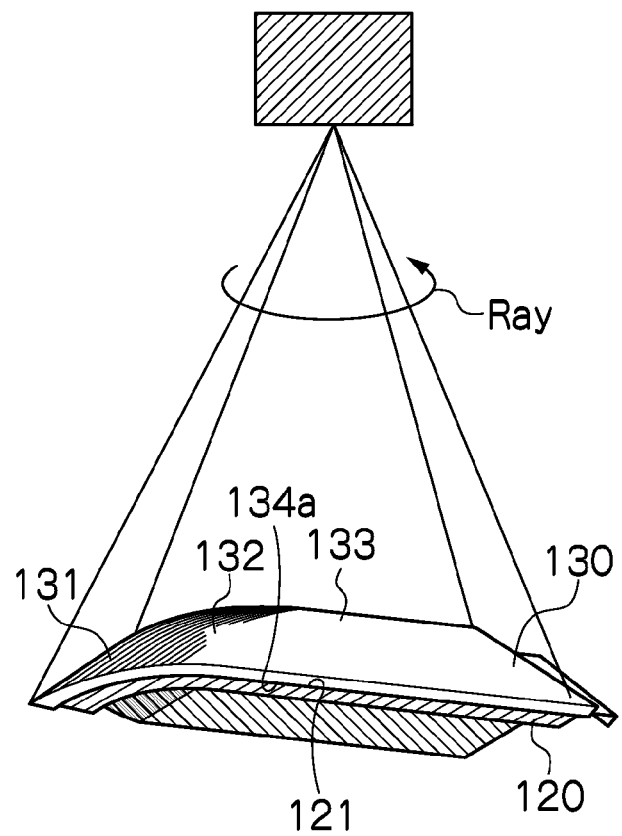
FIG. 4 is a perspective view of the vehicle lighting fitting (including a laser optical system)

The housing 120 can be a thermoplastic resin having an absorption property with respect to a laser light (i.e., the thermoplastic resin can absorb at least a part of laser light so as to perform laser-welding). As illustrated in FIGS. 2 to 4, the housing 120 includes an opening end portion 121 (annular joint surface).

The lens 130 can be a thermoplastic resin lens having a transmission property with respect to a laser light (i.e., transparent to laser light). The lens 130 can include a first lens portion 131, and a second lens portion 133 which continues to (connects to) the first lens portion 131 (in an integrated manner) via a bent lens portion 132, for example, as illustrated in FIG. 4. As illustrated in FIGS. 2 and 3, an annular rib 134 including an annular joint surface 134a at a tip end can be formed on an outer peripheral portion of the lens 130. As illustrated in FIGS. 2 to 4, an outer peripheral portion (annular joint surface 134a) of the lens 130 and the opening end portion 121 of the housing 120 can be laser-welded in the state abutting on each other (in close contact) over the entire perimeters thereof to construct a lighting chamber 150.

Figure 5:
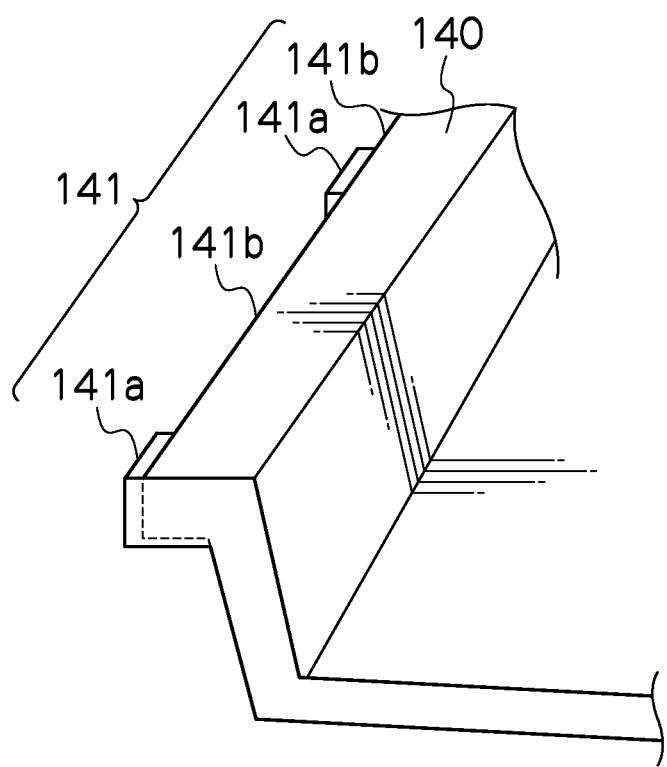
FIG. 5 is a perspective view of an extension of the vehicle lighting fitting.

The extension 140 is a decorative member disposed in the lighting chamber 150. As illustrated in FIGS. 2, 3 and 5, the extension 140 can include an outer peripheral portion 141 on which joint portions 141a including transparent portions 141c and non-joint portions 141b (for example, step portions recessed with respect to the lighting chamber 150 side. See FIG. 5.) alternately continue in a perimeter direction. For example, the joint portions 141a are provided at about six to ten spots (see FIG. 1).

The extension 140 can be formed from a thermoplastic resin having a transmission property with respect to a laser light, for example. For example, in a state in which a mask M (for example, a spring material made by SUS Corporation) illustrated in FIG. 7 is fitted on the joint portion 141a of the extension 140, minor finish such as aluminization can be applied to the whole surface of the extension 140, and thereby, the transparent portion 141c having a transmission property with respect to a laser light is formed at the joint portion 141a of the extension 140 (see FIG. 6).

As illustrated in FIG. 3, the joint portion 141a of the extension 140 and the opening end portion 121 of the housing 120 can be laser-welded in a state in which clearances S1 and S2 (S1 and S2 are, for example, about 0.5 mm. See FIG. 2.) are kept (maintained) between the non-joint portion 141b of the extension 140 and the lens 130, and between the non-joint portion 141b of the extension 140 and the housing 120, respectively.

Next, an example of a manufacturing method for the vehicle lighting fitting 110 will be described.

The laser optical system for performing the laser welding, for example, can be a galvano scan head including a galvano mirror (not illustrated) which scans a laser light for use in laser welding, or a laser emitting device held by a robot arm. When the laser optical system includes a galvano scan head, the galvano scan head is used by being fixed to a frame or the like (not illustrated).

Figure 6:
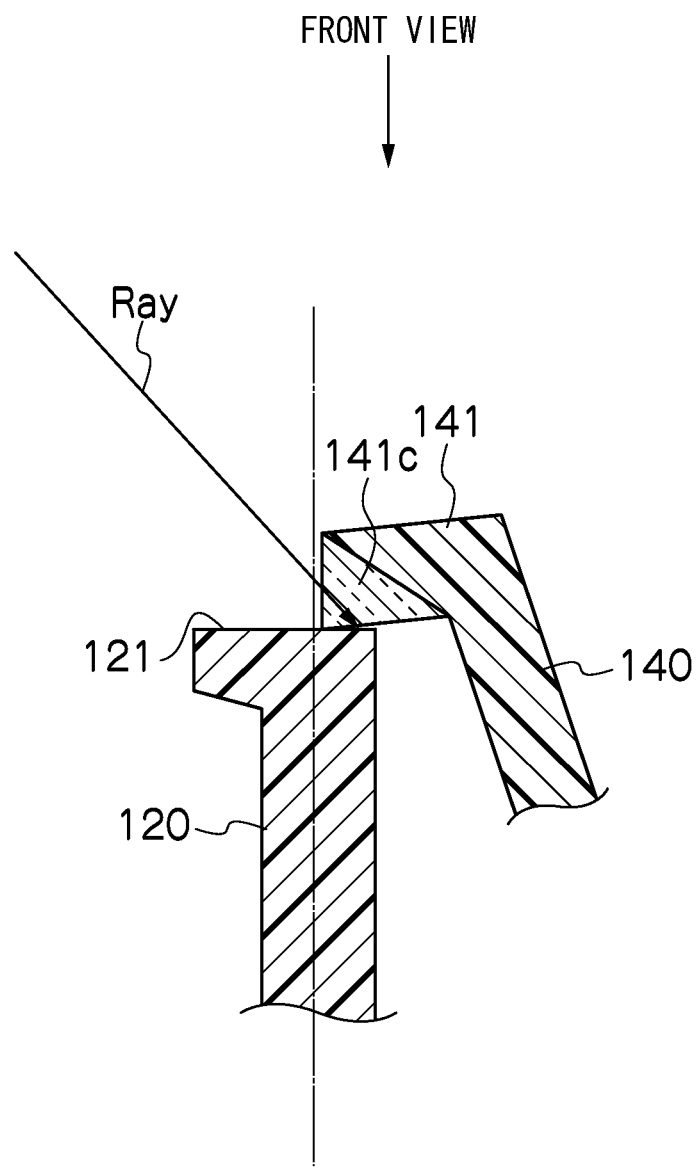
FIG. 6 is a sectional view for explaining a step of laser-welding the extension and a housing of the vehicle lighting fitting.
Figure 7:
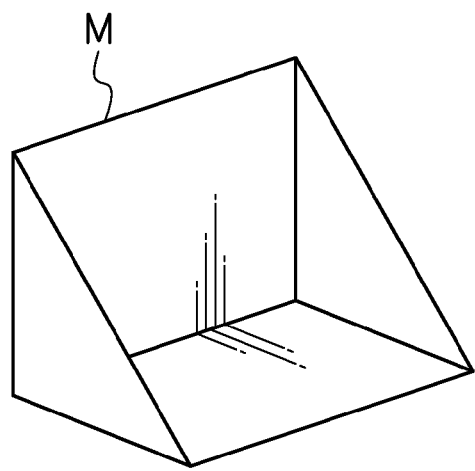
FIG. 7 is an example of a mask M which is used for forming a transparent portion at a joint portion of the extension of the vehicle lighting fitting.

First, the extension 140 and the housing 120 are pressed, and are kept in a state in which the clearance S2 (for example, about 0.5 mm) is kept between the non-joint portion 141b of the extension 140 and the housing 120 (see FIGS. 2 and 3), and in a state in which the transparent portion 141c of the extension 140 and the opening end portion 121 of the housing 120 are caused to abut on each other (see FIG. 6).

As illustrated in FIG. 4, a laser light Ray is scanned so that the laser light Ray transmits through the transparent portion 141c of the extension 140, the opening end portion 121 of the housing 120 on which the transparent portion 141c of the extension 140 abuts is irradiated with the laser light Ray, and the housing 120 and the transparent portion 141c of the extension 140 which abuts on the housing 120 are fused and joined (irradiation direction: for example, 45°±15° with respect to the vertical axis illustrated in FIG. 6 (the alternate long and short dashed line in FIG. 6)).

Figure 8:
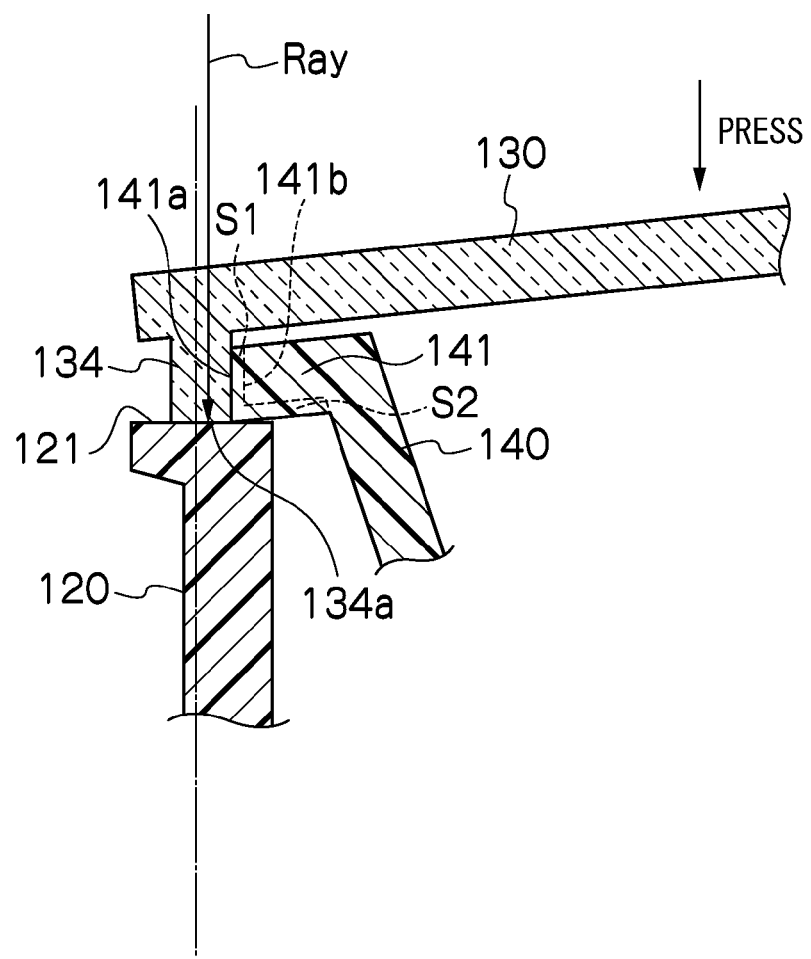
FIG. 8 is a sectional view for explaining a step of laser-welding a lens and the housing of the vehicle lighting fitting.

Next, as illustrated in FIG. 8, the lens 130 and the housing 120 are pressed, and are kept in a state in which the clearance S1 (for example, about 0.5 mm) is kept between the non-joint portion 141b of the extension 140 and the lens 130 (see FIG. 2) and in the state in which the outer peripheral portion (annular joint surface 134a) of the lens 130 and the opening end portion 121 (Outside of the extension 140. See FIG. 8.) of the housing 120 are caused to abut on each other.

Subsequently, the laser light Ray is scanned so that the laser light Ray transmits through the lens 130, the opening end portion 121 of the housing 120 on which the outer peripheral portion (annular joint surface 134a) of the lens 130 abuts is irradiated with the laser light Ray, and the housing 120 and the lens 130 which abuts on the housing 120 are fused and joined (irradiation direction: for example, 0°±60° with respect to the vertical axis illustrated in FIG. 8 (the alternate long and short dashed line in FIG. 8)).

By the above, the vehicle lighting fitting 110 can be constructed, in which the joint portion 141a of the extension 140 and the opening end portion 121 of the housing 120 are laser-welded in a state in which the clearances S1 and S2 (for example, about 0.5 mm) are kept between the non-joint portion 141b of the extension 140, and the lens 130 and the housing 120, respectively.

As described above, according to the present embodiment, the configuration is such that by the action of the clearances S1 and S2 (see FIGS. 2 and 3) between the non-joint portion 141b of the extension 140, and the lens 130 and the housing 120, the lens 130 and the housing 120 are not in close contact with the spot (non-joint portion 141b) which is not laser-welded of the extension 140. Therefore, the friction which occurs between the housing 120 and the extension 140, or lens 130 and the extension 140 can be prevented or reduced. Thereby, the vehicle lighting fitting 110 can be constructed, which can prevent or reduce the problems in which lens 130 is damaged to an extent that exerts an influence on the visual appearance due to friction, and/or in which a frictional sound may occur.

Figure 9:
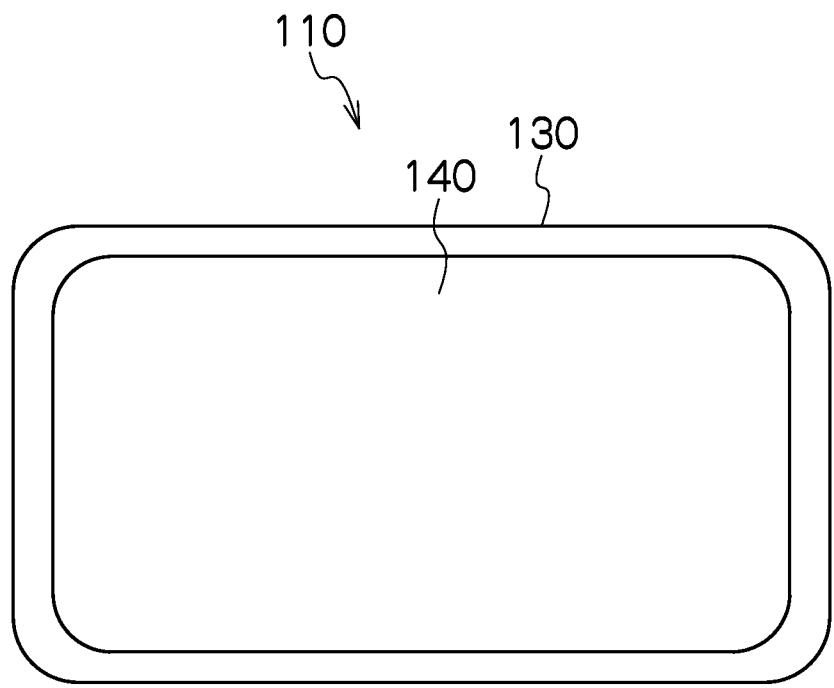
FIG. 9 is a front view of the vehicle lighting fitting.

Further, according to the present embodiment, the extension 140 is disposed on the very edge of the internal dimension of the lens 130 (see FIGS. 2 and 3), and therefore, the vehicle lighting fitting 110 which has excellent visual appearance with the welding mark of the extension 140 and can be almost invisible in a front view can be constructed (see FIG. 9).

Further, according to the present embodiment, the transparent portion 141c of the extension 140 can be hidden in the rear side in front view (see FIG. 6), and thus the vehicle lighting fitting 110 with excellent visual appearance with the transparent portion 141c which may not be recognized visually in a front view can be constructed.

Further, according to the present embodiment the method for manufacturing the vehicle lighting fitting 110 which can prevent or reduce the friction which occurs between the housing 120 and the lens 130, and the extension 140, with the lens 130 and the housing 120, and the spot (non-joint portion 141b) which is not laser-welded of the extension not being in close contact with each other (that is, the vehicle lighting fitting 110 which can prevent or reduce the problems in which, due to friction, the lens 130 is damaged to an extent that exerts an influence on the visual appearance, and/or in which a friction sound may occur).

Next, a modified example will be described.

In the above described embodiment, description is made with respect to the transparent portion 141c is formed at the joint portion 141a of the extension 140 (see FIG. 6). However, the presently disclosed subject matter is not limited to this. For example, mirror finish such as aluminization may be applied onto the whole surface of the extension 140 (also including the joint portion 141). More specifically, the transparent portion 141c does not have to be formed.

Alternatively, in place of the transparent portion 141c, a nontransparent portion having an absorption property to a laser light can be provided, and the nontransparent portion may be laser-welded not only to the housing 120, but also to the lens 130.

Next, a vehicle lighting fitting 210 according to a second embodiment of the presently disclosed subject matter will be described with reference to the drawings.

Figure 10:
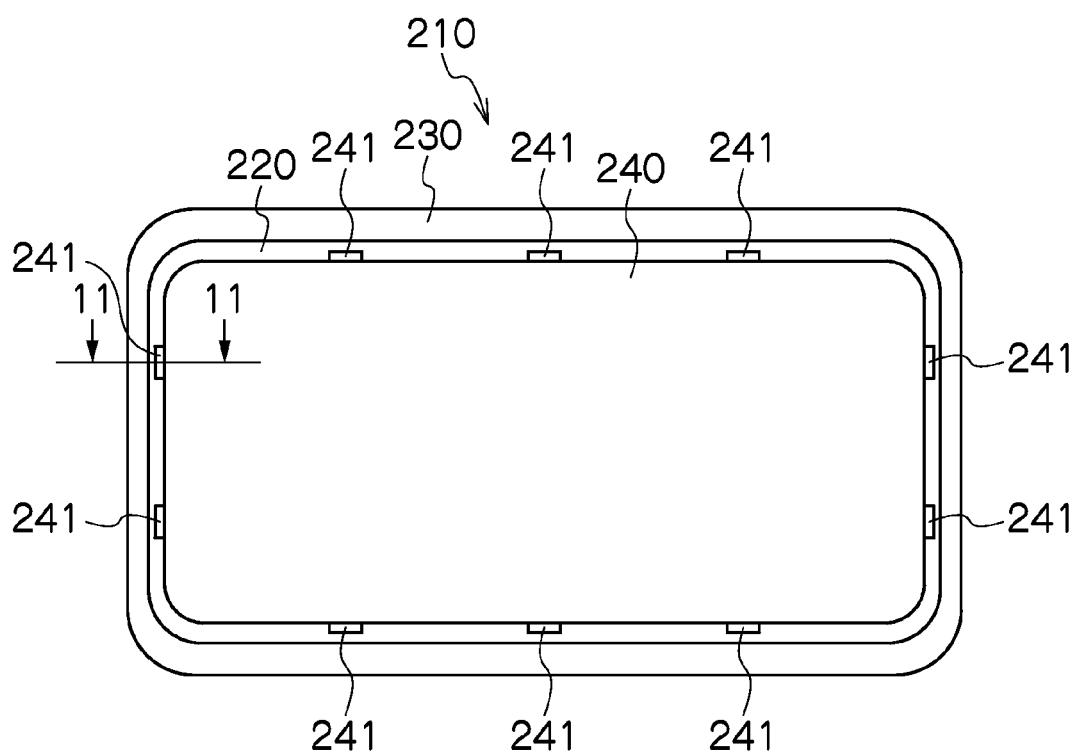
FIG. 10 is a front view of a vehicle lighting fitting according to a second embodiment of the presently disclosed subject matter.

The vehicle lighting fitting 210 of the present embodiment is applied to, for example, vehicle lighting fittings such as rear combination lamps or the like which are respectively disposed at both left and right sides of a vehicle rear portion. The vehicle lighting fitting 210 can include a housing 220, a lens 230 and an extension 240, as illustrated in FIGS. 10 to 12. Of course, the disclosed subject matter can be incorporated into other types of lamps and fixtures, including headlights, turning lights, street lamps, decorative fixtures, and room lighting.

The housing 220 is a thermoplastic resin housing having an absorption property with respect to a laser light. As illustrated in FIG. 11B, the housing 220 includes an opening end portion 221. On the opening end portion 221 of the housing 220, a plurality of recessed portions 221a are formed in a perimeter direction of the opening end portion 221.

The lens 230 can be a thermoplastic resin lens having a transmission property to a laser light. The lens 230 can include a first lens portion 231, and a second lens portion 233 which continues to (is connected to) the first lens portion 231 through a bent lens portion 232, for example, as illustrated in FIG. 12. As illustrated in FIG. 11B, an annular rib 234 including an annular joint surface 234a at a tip end can be formed on an outer peripheral portion of the lens 230.

As illustrated in FIG. 11B, on an inner peripheral side of a tip end portion of the annular rib 234, a plurality of pressing portions 234b which press a plurality of claw portions 241 of the extension 240 and displaces the plurality of claw portions 241 to the inner side (right side in FIG. 11B) can be formed. An outer peripheral portion (annular joint surface 234a) of the lens 230 and the housing 220 (opening end portion 221) can be laser-welded in the state in which the outer peripheral portion and the housing 220 abut on (are in close contact with) each other over the entire perimeters thereof to construct a lighting chamber 250.

Figure 13:
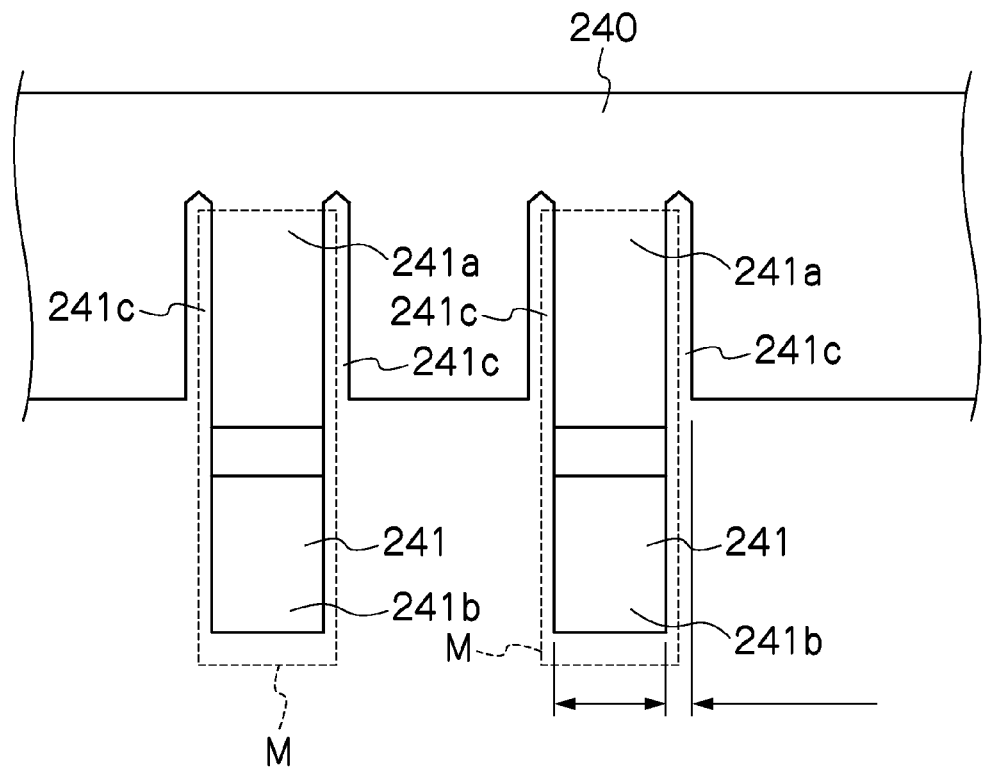
FIG. 13 is a view of a claw portion of an extension seen from an inside of the extension of the vehicle lighting fitting of FIG. 10.

The extension 240 can be a decorative member disposed in the lighting chamber 250. As illustrated in FIGS. 10, 11B and 13, on the outer peripheral portion of the extension 240, a plurality of claw portions 241 which are inserted in the plurality of recessed portions 221a of the housing 220 can be formed in a perimeter direction thereof. For example, the claw portions 241 can be provided at about eight to ten spots (see FIG. 10). If the vehicle lighting fitting 210 is small in size, the claw portions 241 may be provided at about four spots. The extension 240 can be formed of a thermoplastic resin having a transmission property with respect to a laser light, for example.

Figure 14:
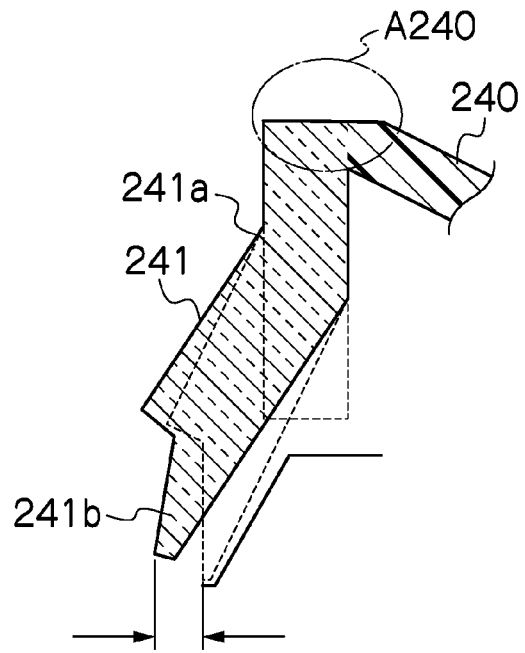
FIG. 14 is a sectional view of the claw portion of the extension of the vehicle lighting fitting of FIG. 10.

As illustrated in FIG. 14, each of the claw portions 241 can be configured as a claw portion (about 10 mm wide) in the shape of a cantilever beam with a base end portion 241a fixed to the outer peripheral portion of the extension 240 and a tip end portion 241b made a free end. Each of the claw portions 241 can be pressed by each of the pressing portions 234b of the lens 230 and displaced to the inner side (right side in FIG. 14) (about 1.0 mm). At both sides of the base end portion 241a, grooves 241c each with a groove width of approximately 2 mm can be formed.

Figure 15:
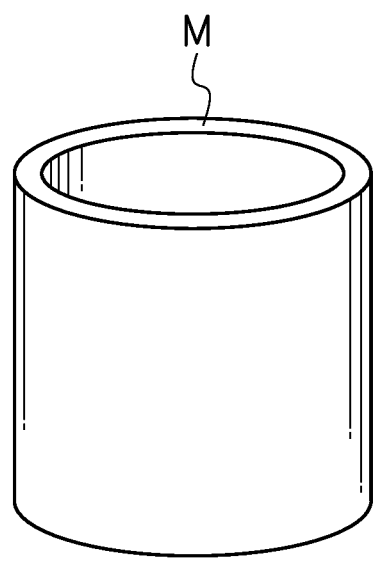
FIG. 15 illustrates an example of a mask M used for making a transparent claw portion of the extension of the vehicle lighting fitting of FIG. 10.

For example, in a state in which a cylindrical mask M (for example, made of a resin, rubber, a spring material made by SUS Corporation or the like) illustrated in FIG. 15 is fitted on each of the claw portions 241 of the extension 240 (see FIG. 13), minor finish such as aluminization can be applied to the whole surface of the extension 240, and thereby, each of the claw portions 241 of the extension 240 is made a transparent claw portion having a transmission property to a laser light. Similarly, the inside of the circular region A240 illustrated in FIG. 14 can also be made a transparent portion.

Figure 16:
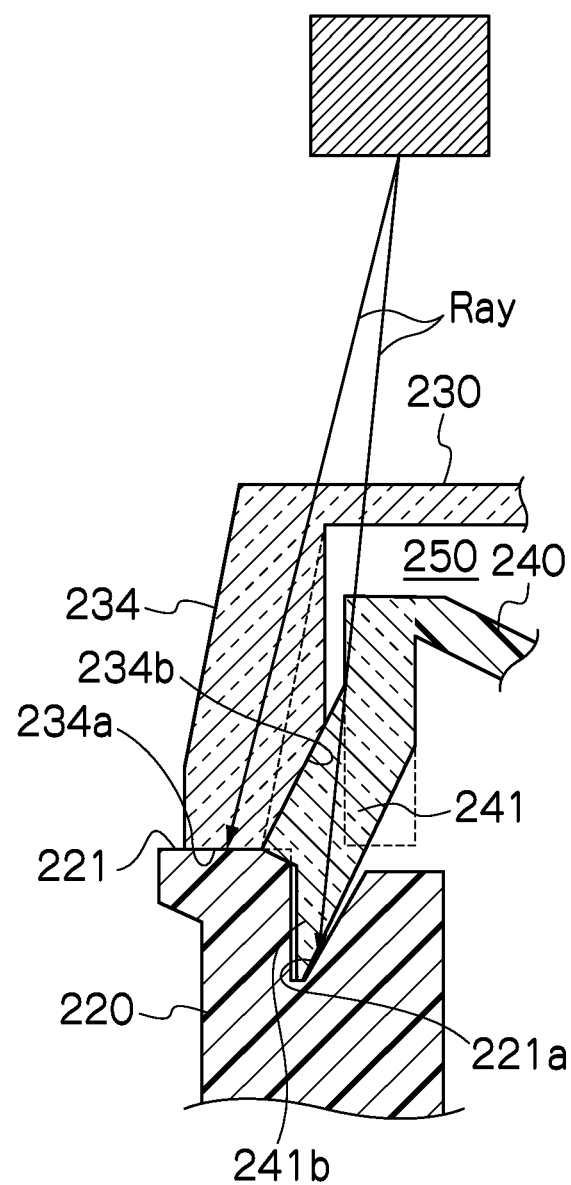
FIG. 16 is a sectional view for explaining a step of laser-welding the lens and the extension, and a housing of the vehicle lighting fitting of FIG. 10.

As illustrated in FIG. 16, the inner peripheral surface of each of the recessed portions 221a and each of the claw portions 241 which is pressed against the inner peripheral surface of each of the recessed portions 221a are laser-welded in the abutting spots thereof.

Next, an example of a manufacturing method for the vehicle lighting fitting 210 will be described.

The laser optical system for performing laser welding, for example, can be a galvano scan head including a galvano minor (not illustrated) which scans a laser light for use in laser welding, or can be a laser emitting device held by a robot arm. When the laser optical system is a galvano scan head, the galvano scan head is used by being fixed to a frame or the like (not illustrated).

First, the housing 220 is set at a receiving tool (not illustrated).

Figure 11A:
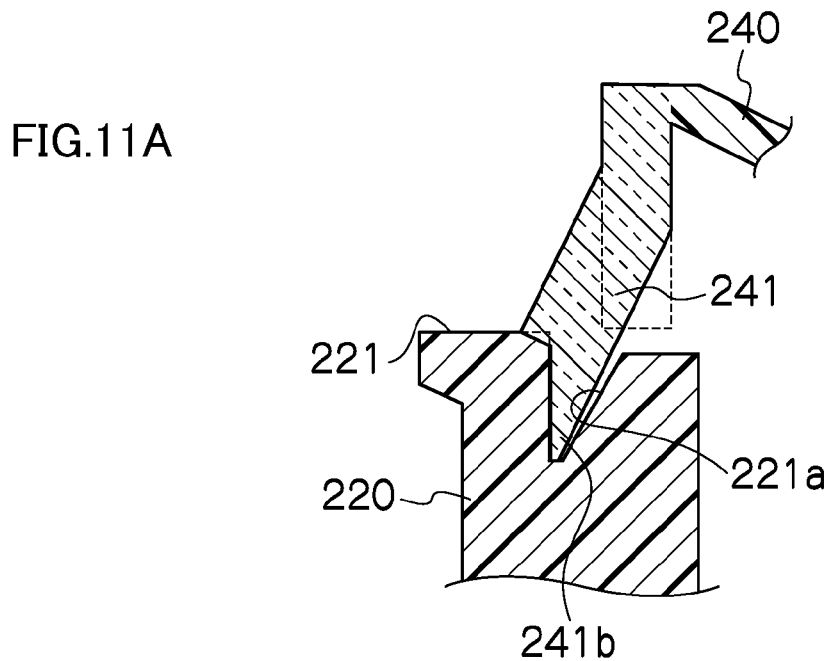
FIG. 11A is a sectional view taken along line 11-11 of the vehicle lighting fitting (except for a lens) illustrated in FIG. 10.
Figure 11B:
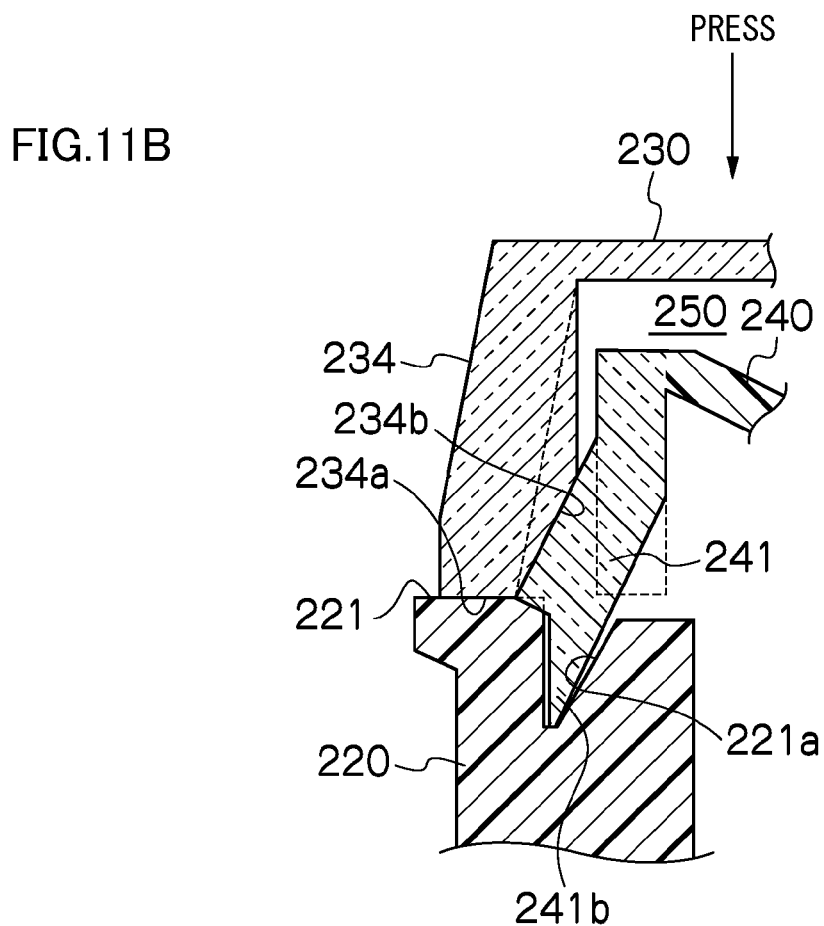
FIG. 11B is a sectional view taken along the line 11-11 of the vehicle lighting fitting (including the lens) illustrated in FIG. 10.
Figure 12:
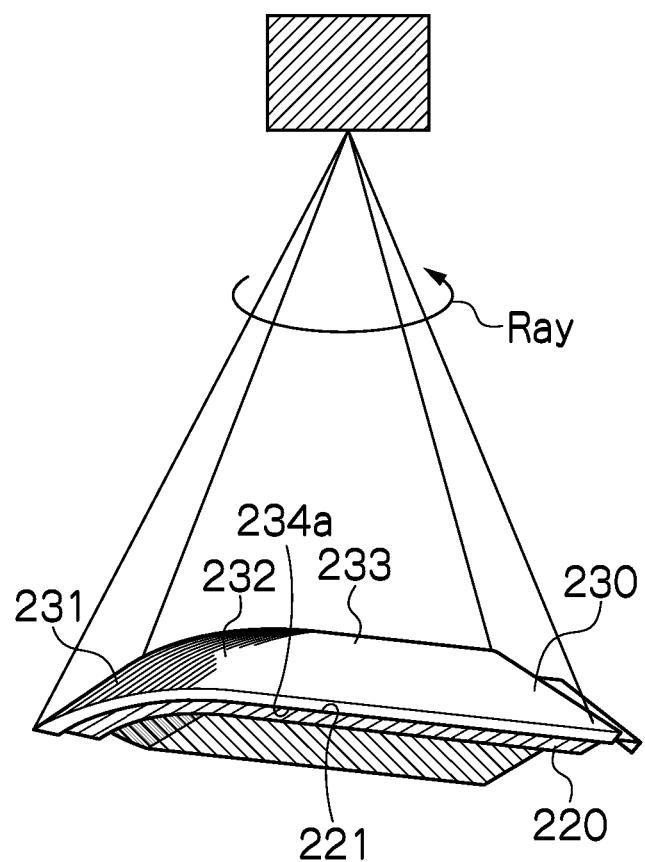
FIG. 12 is a perspective view of the vehicle lighting fitting (including a laser optical system) of FIG. 10.

Next, as illustrated in FIG. 11A, each of the claw portions 241 of the extension 240 is displaced to the inner side (right side in FIG. 11A) (elastically displaced), and is inserted in each of the recessed portions 221a of the housing 220. Each of the claw portions 241 of the extension 240 is displaced to the outside (left side in FIG. 11A) by the restoring force thereof, and is engaged with the inner peripheral surface of each of the recessed portions 221a of the housing 220. Thereby, the extension 240 is fixed to the housing 220. As will be described later, positioning of the extension 240 to the housing 220 is automatically performed, and therefore, positioning of the extension 240 to the housing 220 does not have to be accurately performed here.

Next, as illustrated in FIG. 11B, the lens 230 and the housing 220 are pressed (either by external force or by the self weight of the lens 230), and the lens 230 and the housing 220 are kept in a state in which the outer peripheral portion (annular joint surface 234a) of the lens 230 and the opening end portion 221 of the housing 220 are caused to abut on (be in close contact with) each other over the entire perimeters thereof.

Thereby, each of the pressing portions 234b of the lens 230 presses each of the claw portions 241 of the extension 240 and displaces each of the claw portions 241 to the inner side (right side in FIG. 11B) to press each of the claw portions 241 against the inner peripheral surface of each of the recessed portions 221a. Thereby, the extension 240 (a plurality of claw portions 241) is firmly held between each of the pressing portions 234b of the lens 230 and the inner peripheral surface of each of the recessed portions 221a of the housing 220.

Further, the extension 240 is pressed substantially uniformly from all directions by the action of each of the pressing portions 234b, positioning of the extension 240 (each of the claw portions 241) to the housing 220 is automatically performed. Further, the mounting posture of the extension is controlled to automatically be a proper posture with respect to the vertical and lateral directions.

Next, as illustrated in FIG. 16, a laser light Ray is scanned so that the laser light Ray transmits through the lens 230 and each of the transparent claw portions 241, the opening end portion 221 of the housing 220 on which the lens 230 abuts and the inner peripheral surface of each of the recessed portions 221a to which each of the transparent claw portions 241 is pressed are irradiated with the laser light Ray, and the opening end portion 221 of the housing 220 and the lens 230 (annular joint surface 234a) which abuts on the opening end portion 221, and the inner peripheral surface of each of the recessed portions 221a and each of the claw portions 241 which is pressed against the inner peripheral surface of each of the recessed portions 221a are fused and joined.

The lens 230 and the housing 220 are pressed, and the lens 230 (annular joint surface 234a) and the housing 220 (opening end portion 221) abut on (are in close contact with) each other (see FIG. 11B) over the entire perimeters thereof. Then, the lens 230 sinks with respect to the housing 220 (approximately 0.5 mm) when laser welding is performed over the entire perimeters of the housing 220 and the lens 230.

When the lens 230 sinks with respect to the housing 220, each of the pressing portions 234b of the lens 230 more firmly presses each of the claw portions 241 of the extension 240 to displace each of the claw portions 241 to the inner side (right side in FIG. 16) and to press each of the claw portions 241 more firmly against the inner peripheral surface of each of the recessed portions 221a, since the pressing portion 234b of the lens 230 and the claw portion 241 of the extension 240 on which the pressing portion 234b abuts are respectively inclined surfaces (see FIG. 16). Thereby, the extension 240 (each of the claw portions 241) is more firmly held between each of the pressing portions 234b and the inner peripheral surface of each of the recessed portions 221a.

Further, when the lens 230 sinks with respect to the housing 220, the extension 240 is further firmly pressed from four sides by the action of each of the pressing portions 234b. Therefore, positioning of the extension 240 (each of the claw portions 241) to the housing 220 is automatically performed. Further, the mounting posture of the extension is controlled to automatically be a proper posture with respect to the vertical and the lateral directions.

From above, the vehicle lighting fitting 210 in which laser welding is applied in a state in which the extension 240 (each of the claw portions 241) is firmly held between each of the pressing portions 234b and the inner peripheral surface of each of the recessed portions 221a can be manufactured.

As described above, according to the present embodiment, laser welding is applied in a state in which each of the claw portions 241 is pressed to be displaced to the inner side by each of the pressing portions 234b and pressed against the inner peripheral surface of each of the recessed portions 221a. Specifically, laser welding is applied in a state in which the extension 240 (each of the claw portions 241) is firmly held between the lens 230 (each of the pressing portions 234b) and the housing 220 (inner peripheral surface of each of the recessed portions 221a). Therefore, as compared with the conventional art illustrated in FIG. 29 in which the housing 410 and the lens 420, and the decorative member 430 are simply laser-welded, occurrence of friction between the components as a result that the components (the housing 220, the lens 230 and the extension 240) of the vehicle lighting fitting 210 relatively move can be prevented or reduced. Thereby, the vehicle lighting fitting 210 can be constructed, which can prevent or reduce the problems that, due to the friction, the lens 230 is damaged to an extent that exerts an influence on the visual appearance, and/or in which a frictional sound may occur.

Further, according to the presently disclosed subject matter, the extension 240 is disposed on the very edge of the inner dimension of the lens 230 (see FIG. 11B and the like). Then, the vehicle lighting fitting 210 can be constructed, which has excellent visual appearance with the welding mark of the extension 240 being substantially invisible in front view.

Figure 29:
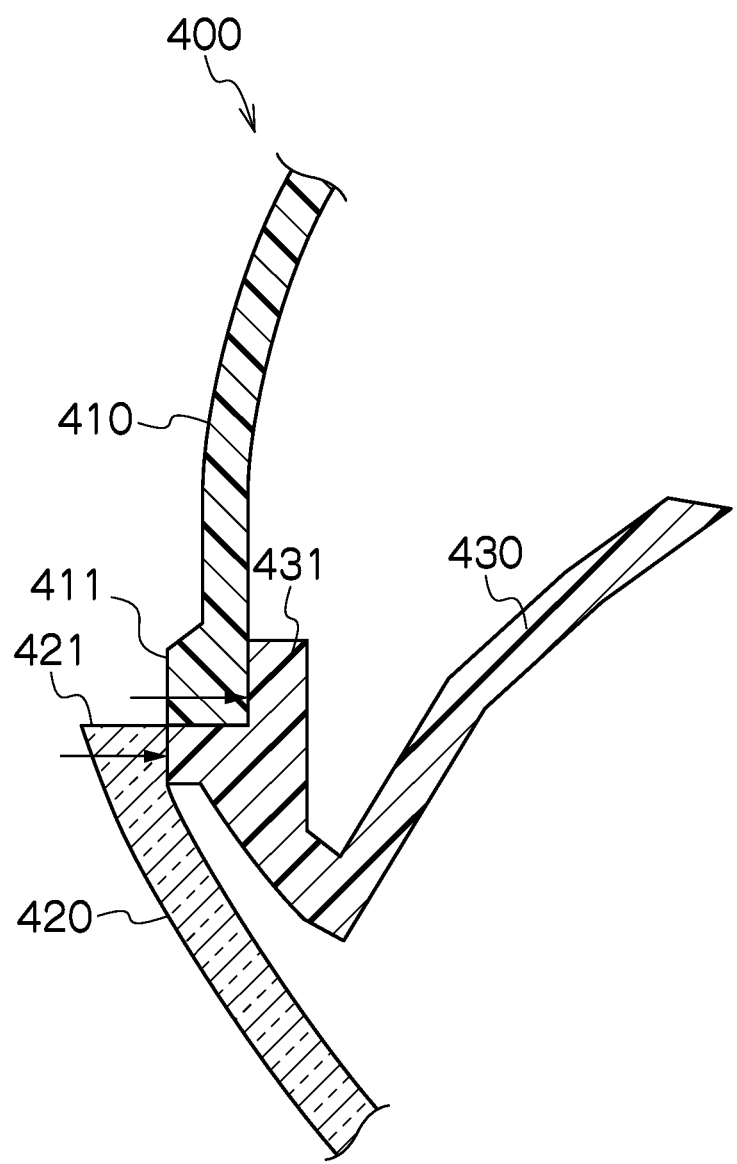
FIG. 29 is a sectional view for explaining a configuration of a conventional vehicle lighting fitting.

Further, according to the present embodiment, the vehicle lighting fitting 210 can be manufactured, which can prevent or reduce occurrence of friction between the components as a result that the components (the housing 220, the lens 230 and the extension 240) of the vehicle lighting fitting 210 relatively move (more specifically, the vehicle lighting fitting which can prevent or reduce the problems in which, due to the friction, the lens is damaged to an extent that exerts an influence on the visual appearance, and/or in which a frictional sound may occur), as compared with the conventional art illustrated in FIG. 29 in which the housing 410 and the lens 420, and the decorative member 430 are simply laser-welded.

Further, according to the present embodiment, the configuration is such that the four sides of the extension 240 are substantially uniformly pressed by the action of each of the pressing portions 234b. Therefore, positioning of the extension 240 to the housing 220 can be automatically performed. Further, the mounting posture of the extension 240 can be controlled to automatically be a proper posture with respect to the vertical and the lateral directions.

Further, according to the present embodiment, by only performing positioning of the lens 230 to the housing 220, positioning of the extension 240 to the housing 220 can be automatically performed (Conventionally, in order to perform laser welding properly, both the positioning of the lens 420 to the decorative member 430, and the positioning of the housing 410 to the decorative member 430 have to be accurately performed. See FIG. 29.)

Next, a modified example will be described.

In the above described embodiment, the example in which the decorative member is the extension 240 to which minor finish is applied. However, the presently disclosed subject matter is not limited to this. For example, the decorative member may be an inner lens or a transparent extension.

Next, a vehicle lighting fitting 310 according to a third embodiment of the presently disclosed subject matter will be described with reference to the drawings.

The vehicle lighting fitting 310 of the present embodiment is applied to vehicle lighting fittings such as rear combination lamps or the like which are respectively disposed at both left and right sides of a vehicle rear portion, for example. The vehicle lighting fitting 310 can include a housing 320, a lens 330 and an extension 340, as illustrated in FIGS. 17 to 20. Of course, the disclosed subject matter can be incorporated into other types of lamps and fixtures, including headlights, turning lights, street lamps, decorative fixtures, and room lighting.

Figure 18:
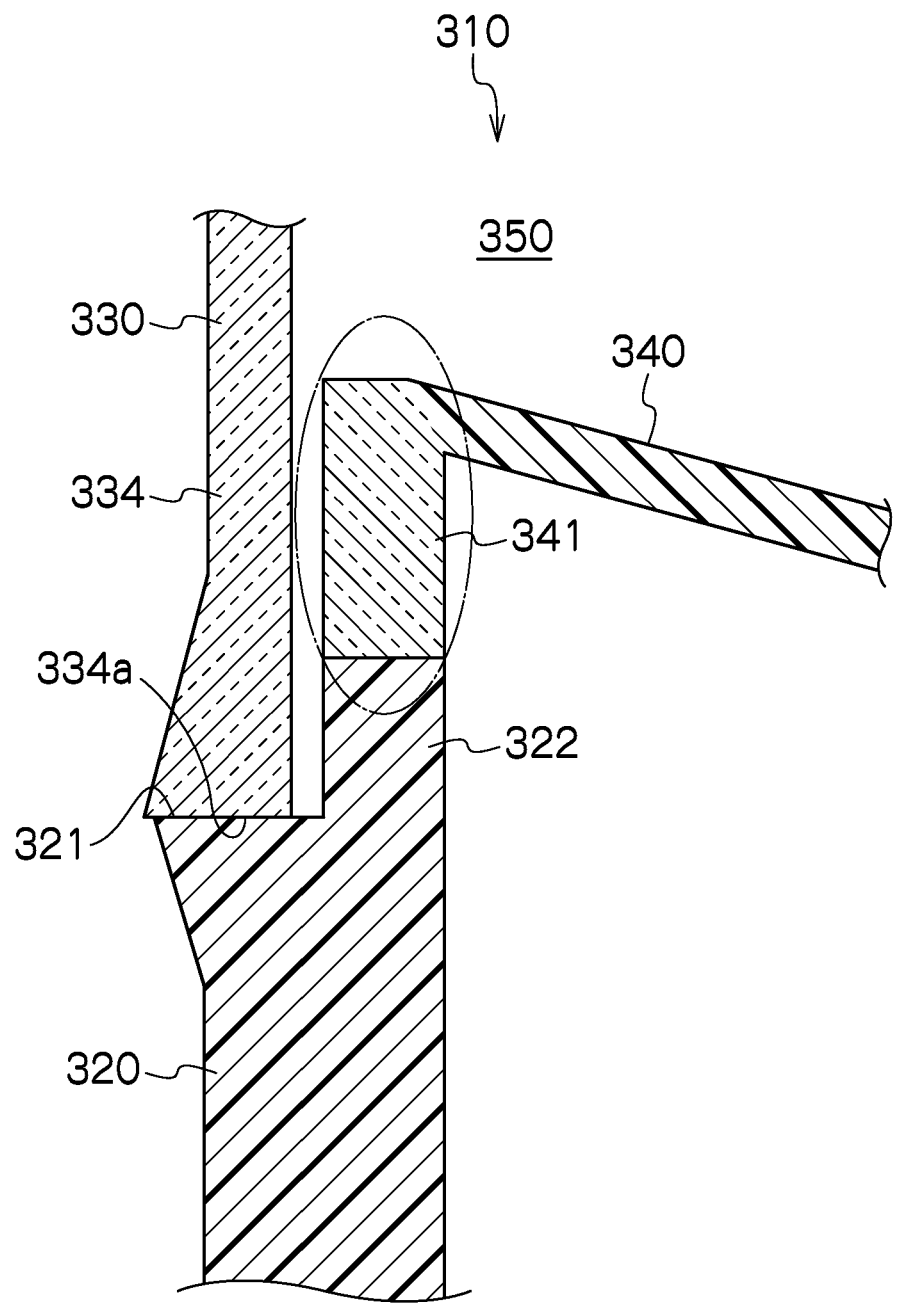
FIG. 18 is a sectional view taken along line 18-18 of the vehicle lighting fitting (including the lens) illustrated in FIG. 17.
Figure 20:
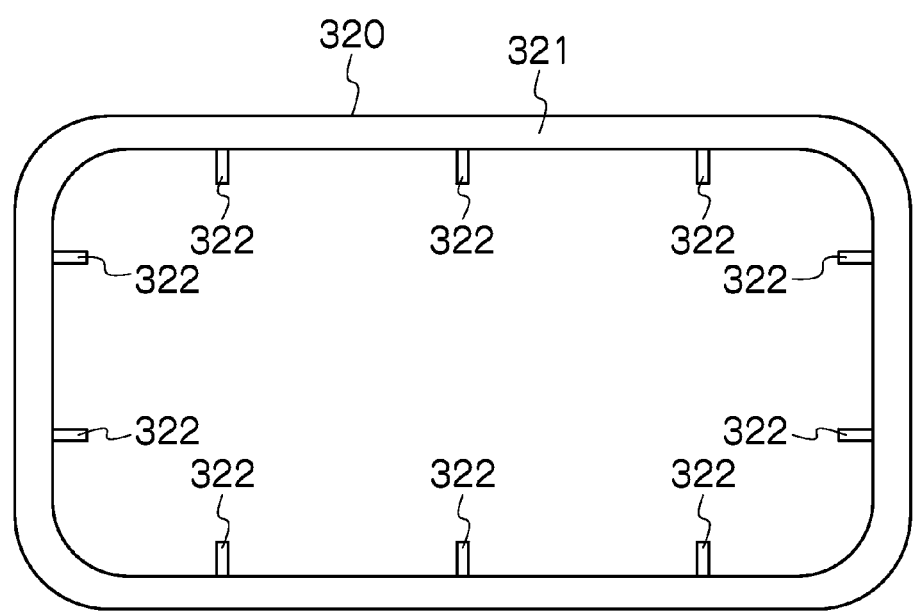
FIG. 20 is a front view of a housing of the vehicle lighting fitting of FIG. 17.

The housing 320 can be a thermoplastic resin housing having an absorption property to a laser light. As illustrated in FIGS. 18 and 20, the housing 320 includes an opening end portion 321. On an inside of the opening end portion 321 of the housing 320, a plurality of joint portions 322 can be formed in a perimeter direction thereof. For example, the joint portions 322 can be provided at about eight to ten spots (see FIG. 20). If the vehicle lighting fitting 310 is small in size, the joint portions 322 may be provided at four spots.

Figure 19:
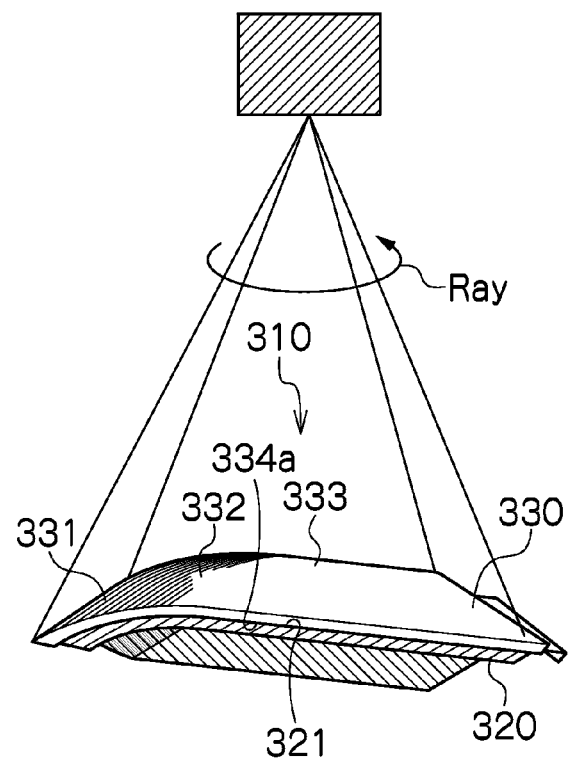
FIG. 19 is a perspective view of the vehicle lighting fitting (including a laser optical system) of the vehicle lighting fitting of FIG. 17.

The lens 330 can be a thermoplastic resin lens having a transmission property to a laser light. The lens 330 can include a first lens portion 331, and a second lens portion 333 which continues to (is connected to) the first lens portion 331 via a bent lens portion 332, for example, as illustrated in FIG. 19. As illustrated in FIG. 18, an annular rib 334 including an annular joint surface 334a at a tip end can be formed at an outer peripheral portion of the lens 330.

Figure 21:
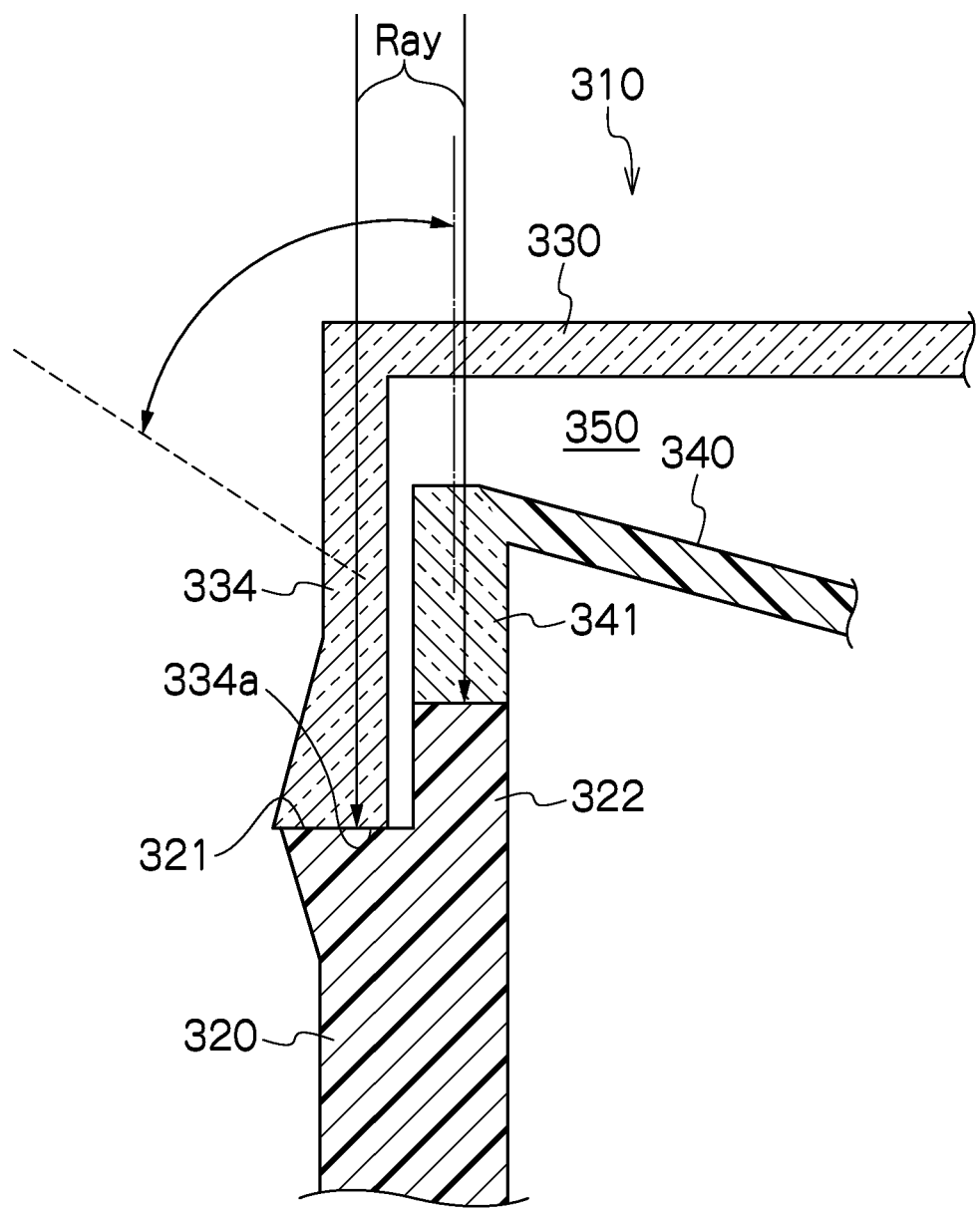
FIG. 21 is a sectional view for explaining a step of laser-welding the lens and an extension, and the housing of the vehicle lighting fitting of FIG. 17.
Figure 22:
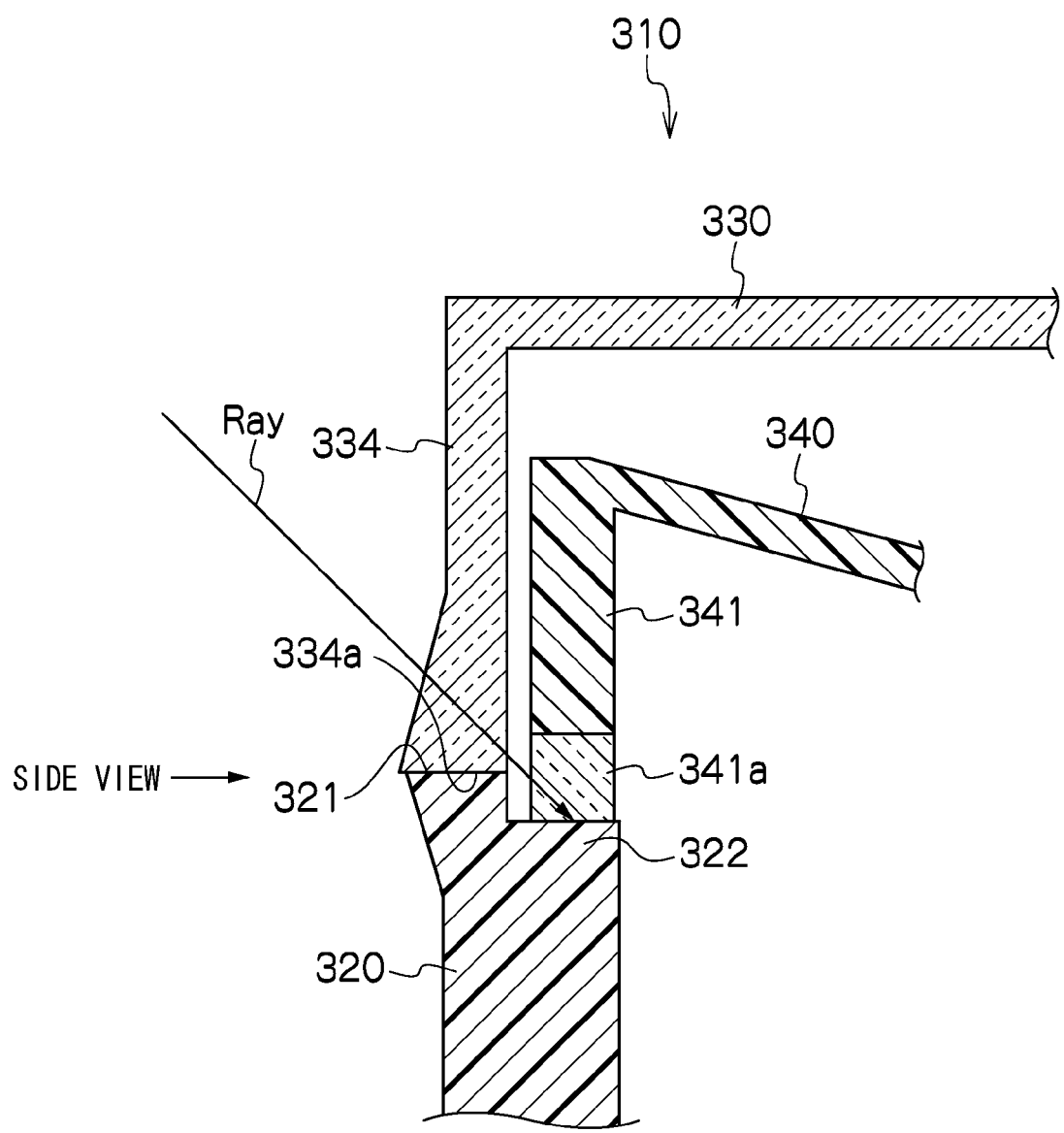
FIG. 22 is a sectional view for explaining a modified example of a vehicle lighting fitting.

As illustrated in FIGS. 18 and 21, an outer peripheral portion (annular joint surface 334a) of the lens 330 and the housing 320 (opening end portion 321) can be laser-welded in the state in which the annular joint surface 334a and the opening end portion 321 abut on (are in close contact with) each other over the entire perimeters thereof to construct a lighting chamber 350.

The extension 340 can be a decorative member disposed in the lighting chamber 350. As illustrated in FIG. 18, the annular rib 341 can be formed at an outer peripheral portion of the extension 340. The extension 340 can be formed from, for example, a thermoplastic resin having a transmission property to a laser light (For example, a PET (polyethylene terephthalate) resin and polycarbonate, which may be colored.).

For example, surface treatment such as aluminization or coating can be applied onto the whole surface of the extension 340 with the entire annular rib 341 (circle range illustrated in FIG. 18) covered with a mask (not illustrated), whereby the annular rib 341 of the extension 340 can be formed as a transparent annular rib having a transmission property with respect to a laser light. The extension 340 including the transparent annular rib 341 may be constructed by dual-molding of the annular rib 341 (thermoplastic resin having a transmission property with respect to a laser light) and the other portions (thermoplastic resin having an absorption property with respect to a laser light, for example).

Figure 17:
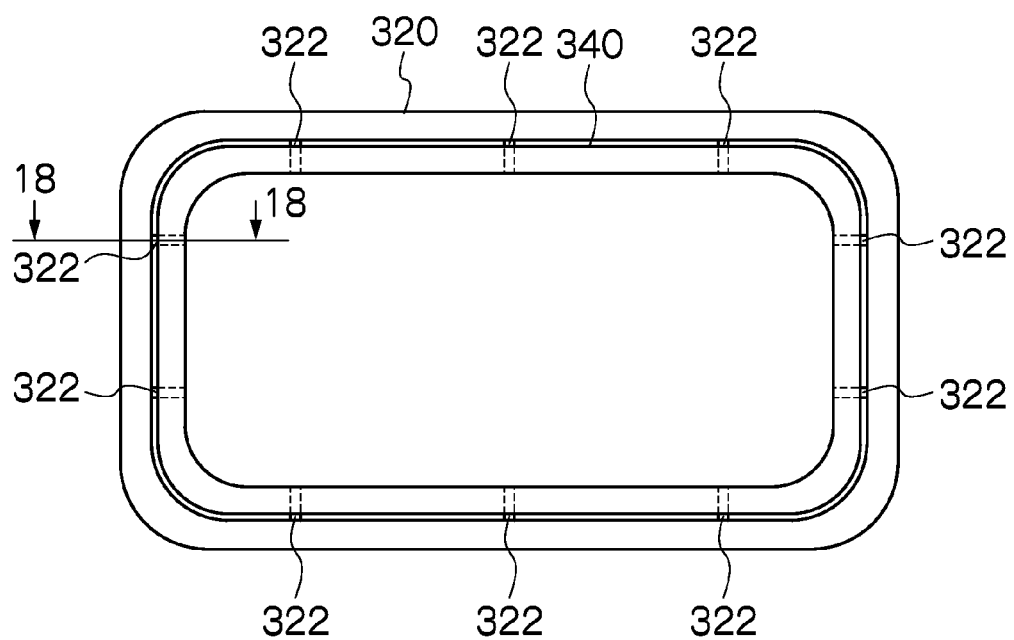
FIG. 17 is a front view of a vehicle lighting fitting (except for a lens) according to a third embodiment of the presently disclosed subject matter.

As illustrated in FIGS. 17 and 18, the outer peripheral portion (transparent annular rib 341) of the extension 340 and each of the joint portions 322 of the housing 320 are laser-welded at their abutment spot.

Next, an example of a manufacturing method for the vehicle lighting fitting 310 will be described.

The laser optical system for performing the following laser welding, for example, can be a galvano scan head including a galvano minor (not illustrated) which scans a laser light for use in laser welding, or a laser emitting device held by a robot arm. When the laser optical system is a galvano scan head, the galvano scan head is used by being fixed to a frame or the like (not illustrated).

First, as illustrated in FIG. 21, the outer peripheral portion (transparent annular rib 341) of the extension 340 and each of the joint portions 322 of the housing 320 are caused to abut on each other (for example, by a self weight of the extension 340), and the outer peripheral portion (annular joint surface 334a) of the lens 330 and the opening end portion 321 of the housing 320 are held in the state in which the outer peripheral portion and the opening end portion 321 are caused to abut on each other (for example, by pressing the lens 330 and the housing 320, or by a self weight of the lens 330).

Next, the laser light Ray is scanned so that the laser light Ray transmits through the lens 330 and the transparent annular rib 341 of the extension 340, the opening end portion 321 of the housing 320 on which the outer peripheral portion (annular joint surface 334a) of the lens 330 abuts and each of the joint portions 322 of the housing on which the transparent annular rib 341 of the extension 340 abuts are irradiated with the laser light Ray, and the opening end portion 321 of the housing 320 and the outer peripheral portion (annular joint surface 334a) of the lens 330 which abuts on the opening end portion 321, and each of the joint portions 322 of the housing 320 and the transparent annular rib 341 of the extension 340 which abuts on each of the joint portions 322 of the housing 320 are fused and joined (irradiation direction: for example, 45°±15° with respect to the vertical axis illustrated in FIG. 21 (the alternate long and short dashed line in FIG. 21)).

By the above, the vehicle lighting fitting 310 can be manufactured, in which the extension 340 (transparent annular rib 341) and the housing 320 (each of the joint portions 322) are laser-welded, and the outer peripheral portion (annular joint surface 334a) of the lens 330 and the housing 320 (opening end portion 321) are laser-welded.

As described above, according to the present embodiment, the configuration is such that the outer peripheral portion (transparent annular rib 341) of the extension 340 and each of the joint portions 322 of the housing 320 are laser-welded, and the other spots are not in contact with one another (see FIG. 17), friction which occurs between the housing 320 and lens 330, and the extension 340 can be prevented or reduced. Thereby, the vehicle lighting fitting which can prevent or reduce the problems that due to the friction, the lens 330 is damaged to exert an influence on the visual appearance, or a frictional sound is produced.

Further, according to the present embodiment, the extension 340 is disposed on the very edge of the internal dimension of the lens 330 (see FIGS. 18, 22 and 25 to 28). Therefore, the vehicle lighting fitting 310 which has excellent visual appearance with the welding mark of the extension 340 being almost invisible in front view can be constructed.

Further, according to the present embodiment, the vehicle lighting fitting 310 can be manufactured, in which the spots other than the laser-welding spot of the outer peripheral portion (transparent annular rib 341) of the extension 340 and each of the joint portions 322 of the housing 320 are not in close contact with each other (see FIG. 17). Then, the friction which occurs between the housing 320 and the lens 330, and the extension 340 can be prevented or reduced (that is, the vehicle lighting fitting which can prevent or reduce the problems in which, due to the friction, the lens is damaged to an extent that exerts an influence on the visual appearance, and/or a friction sound may occur).

Next, a modified example will be described.

In the above described embodiment, the example is described, in which each of the joint portions 322 of the housing 320 is formed at a position which is one step higher than the opening end portion 321 (see FIGS. 18 and 21). However, the presently disclosed subject matter is not limited to this. For example, as illustrated in FIG. 22 and FIGS. 25 to 28, each of the joint portions 322 of the housing 320 may be formed at a position which is one step lower than the opening end portion 321.

In this manner, the laser-welded spot of each of the joint portions 322 of the housing 320 and the outer peripheral portion (transparent rib 341) of the extension 340 is covered with the opening end portion 321 of the housing 320 in side view (see FIGS. 22 and 25 to 28). Therefore, the vehicle lighting fitting 310 can be constructed, in which the laser-welded spot cannot or is difficult to be visually recognized (or hardly recognized visually) from the side surface.

Further, in the above described embodiment, the example in which the entire annular rib 341 of the extension 340 is a transparent annular rib is described (see FIG. 18), but the presently disclosed subject matter is not limited to this. For example, as illustrated in FIGS. 22 and 25 to 28, only the tip end portion 341a of the annular rib 341 of the extension 340 may be a transparent tip end portion having a transmission property to a laser light.

In this manner, the transparent tip end portion 341a of the extension 340 is in the form hidden in the rear surface side in front view (see FIGS. 22 and 25 to 28). Therefore, the vehicle lighting fitting 310 with excellent visual appearance in which the transparent tip end portion 341a is not visually recognized (or hardly recognized visually) from the front can be constructed.

Figure 23A:
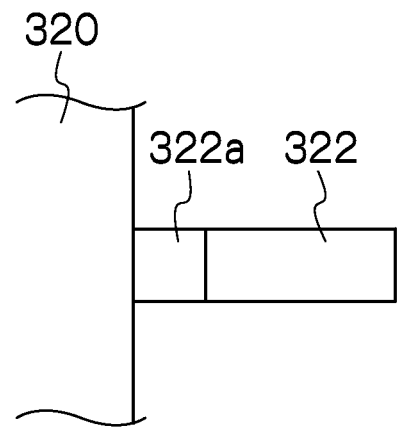
FIG. 23A is a top view and FIG. 23B is a sectional view, for explaining a modified example of a joint portion of the housing of a vehicle lighting fitting.
Figure 23B:
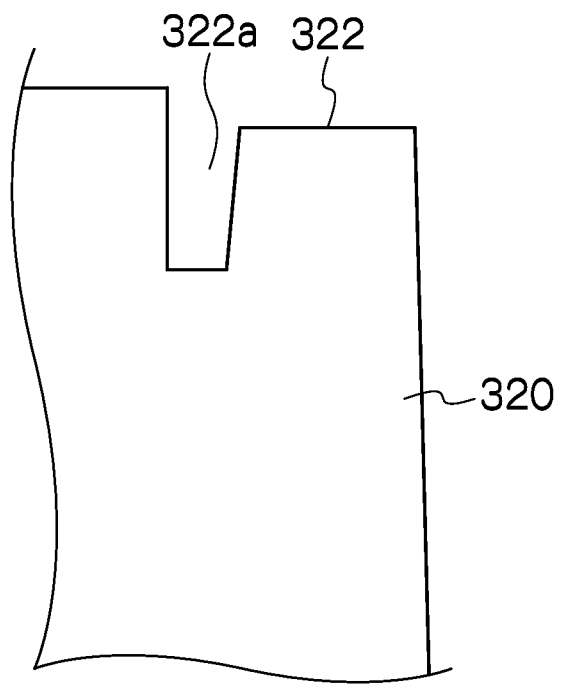
Figure 24A:
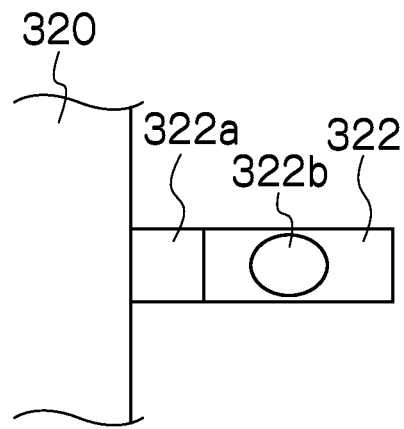
FIG. 24A is a top view and FIG. 24B is a sectional view, for explaining another modified example of a joint portion of a housing for a vehicle lighting fitting.
Figure 24B:
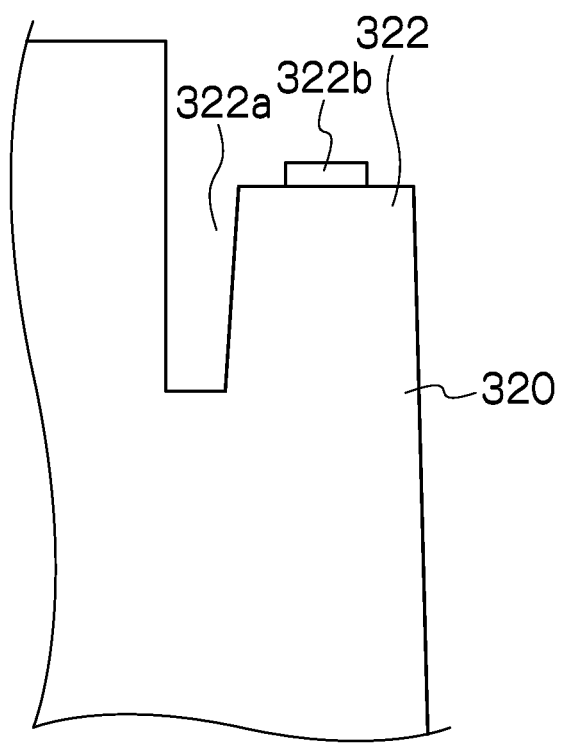

Further, as illustrated in FIGS. 23A and 23B, a recessed portion 322a in which the transparent rib 341 (or the transparent tip end portion 341a) of the extension 340 is inserted and engaged may be formed in each of the joint portions 322 of the housing 320. In this manner, positioning and fixing of the extension 340 to the housing 320 can be easily performed. In this case, as illustrated in FIGS. 24A and 24B, a welding margin 322b (maximum value of height: approximately 1.5 mm Max) may be formed at each of the joint portions 322 of the housing 320. Thus, positioning of the extension 340 to the housing 320 can be easily performed, and occurrence of resin smear can be prevented.

Figure 25:
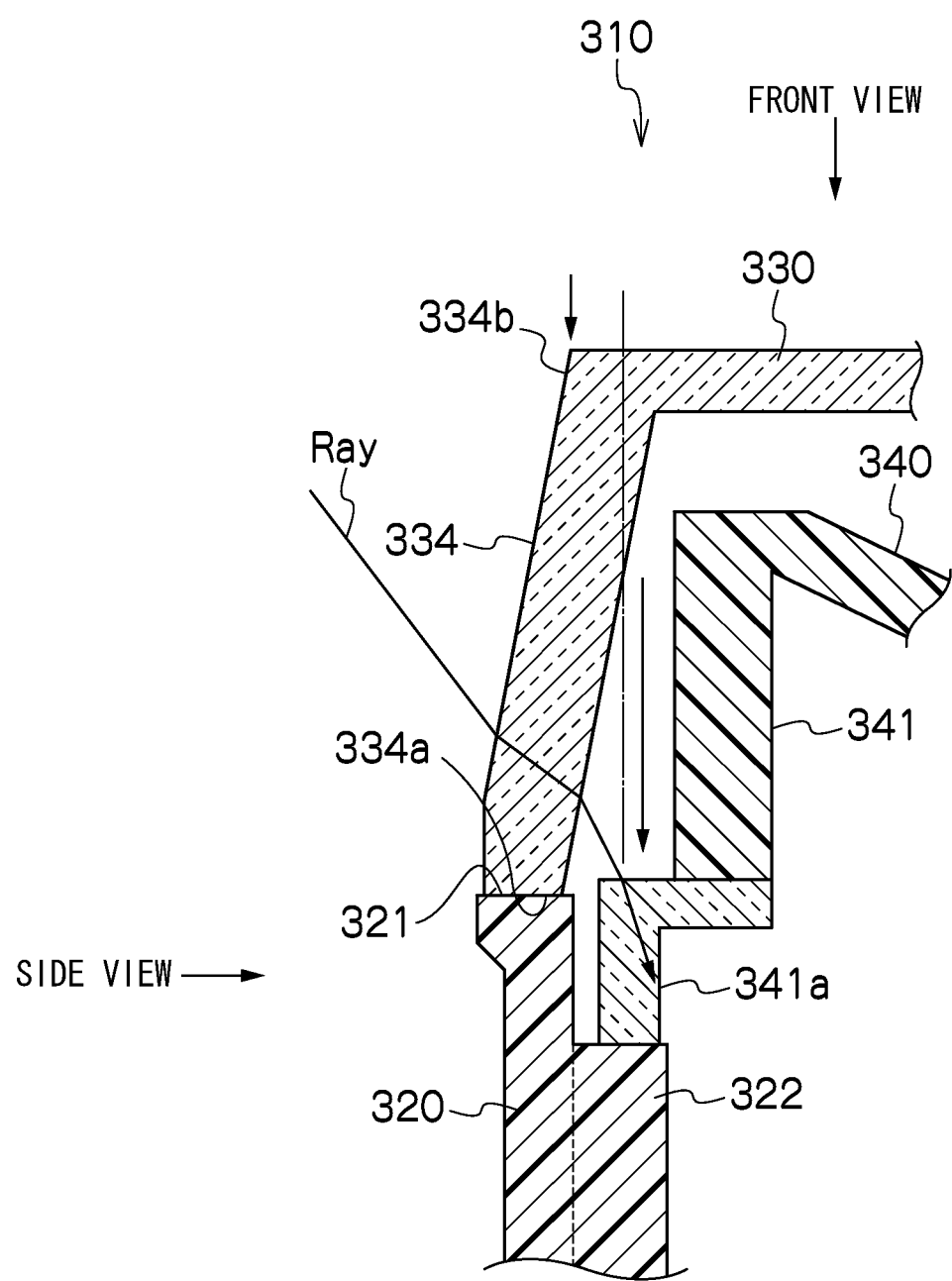
FIG. 25 is a sectional view for explaining a first modified example of the vehicle lighting fitting of FIG. 17.
Figure 26:
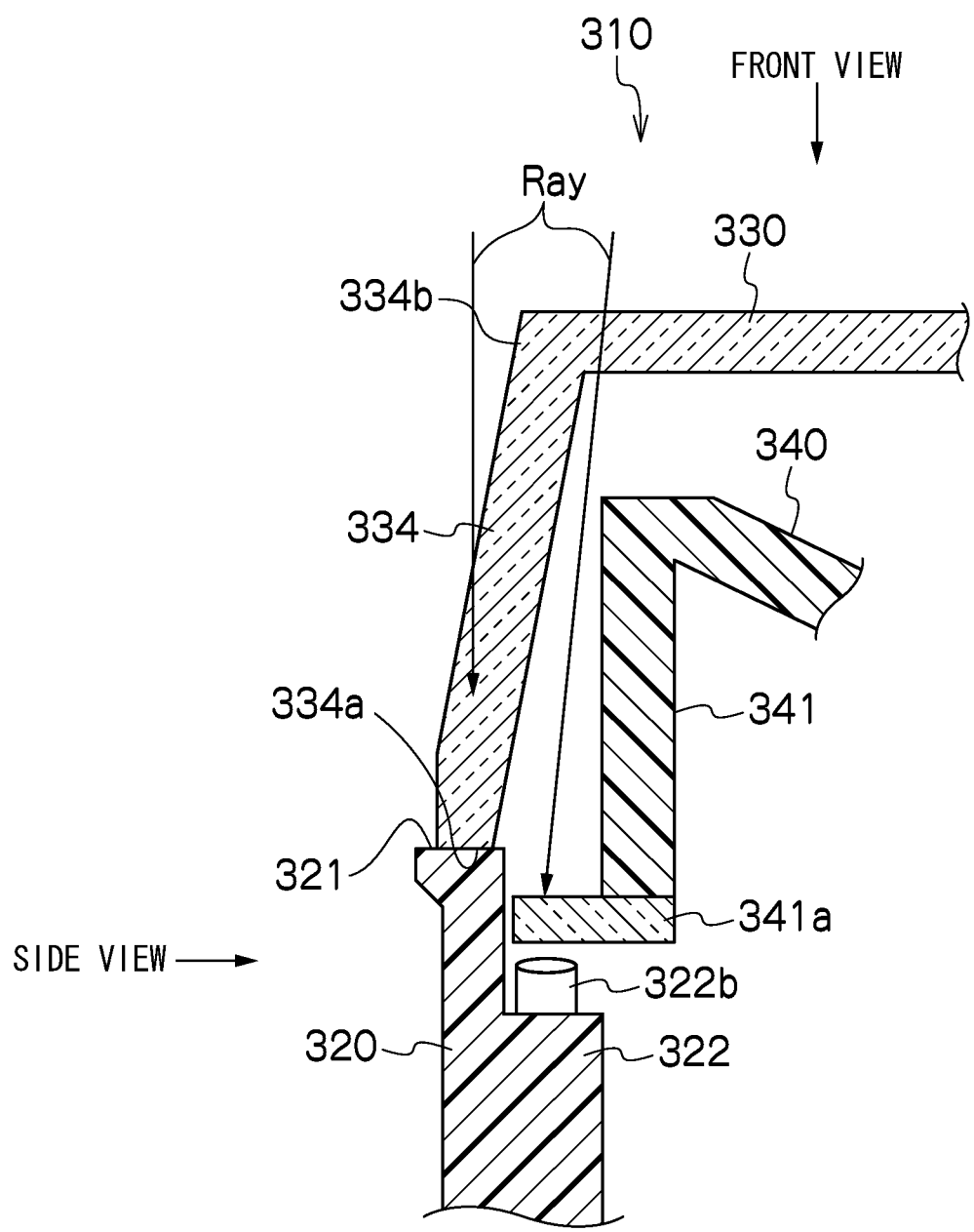
FIG. 26 is a sectional view for explaining a second modified example of the vehicle lighting fitting of FIG. 17.

Further, as illustrated in FIGS. 25 and 26, the annular rib 334 of the lens 330 may be in a tapered shape such that a size in front view of annular rib 334 becomes narrower toward a base end 334b from the tip end 334a. In other words, an outermost peripheral portion of the annular rib 334 decreases in size as the annular rib 334 approaches the base end 334b. In FIGS. 25 and 26, the extension 340 continues to (is connected to) the transparent portion 341a which is extended to the inner side (right direction in FIGS. 25 and 26) so as not to interfere with the annular rib 334.

In this manner, the laser-welded spot of the outer peripheral portion (the transparent rib 341 or the transparent tip end portion 341a) of the extension 340 and each of the joint portions 322 of the housing 320 is covered with the annular rib 334 of the lens 330 in front view (see FIGS. 25 and 26). Therefore, the vehicle lighting fitting 310 with excellent visual appearance with the laser-welded portion being not visually recognized (or hardly recognized visually) from the front can be constructed.

Figure 27:
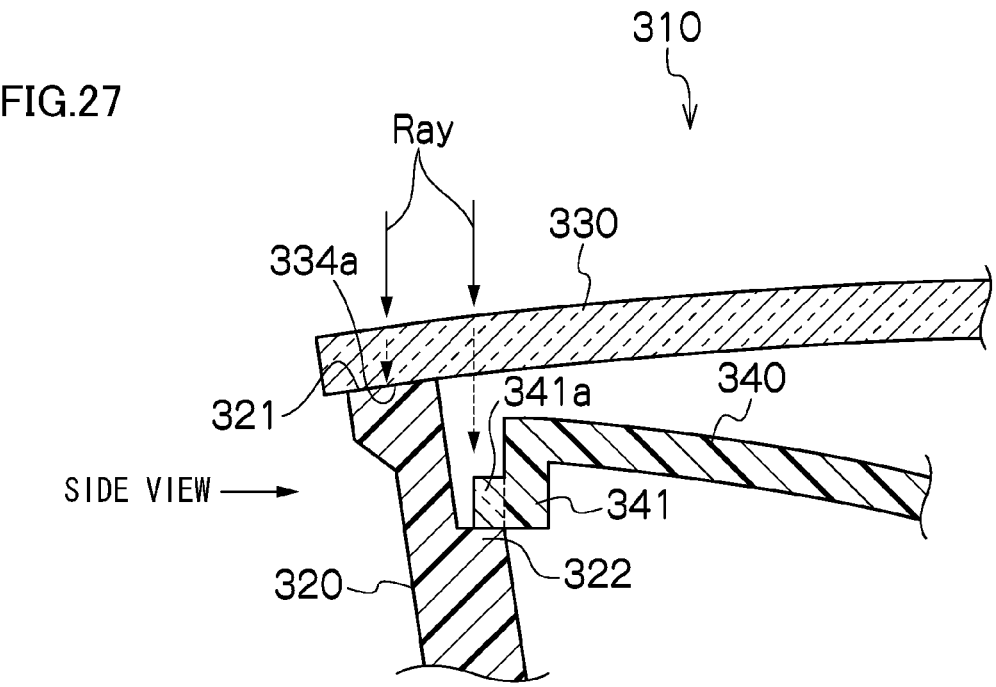
FIG. 27 is a sectional view for explaining a third modified example of the vehicle lighting fitting of FIG. 17.
Figure 28:
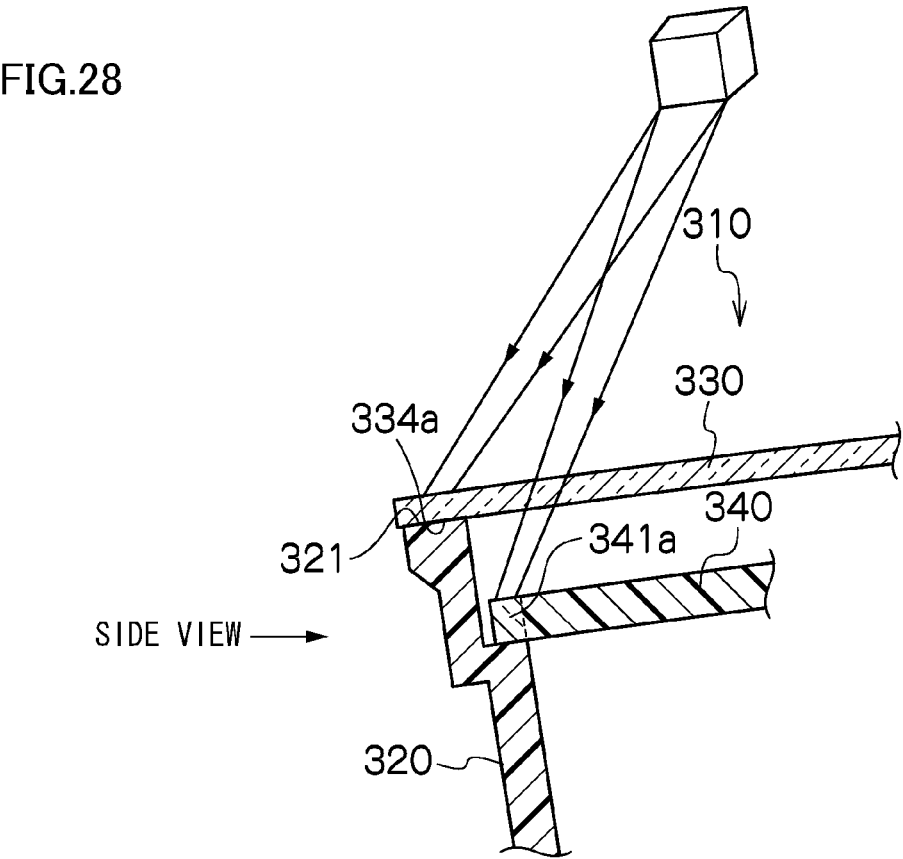
FIG. 28 is a sectional view for explaining a fourth modified example of the vehicle lighting fitting of FIG. 17.

As illustrated in FIGS. 27 and 28, the lens 330 and the extension 340 (transparent tip end portion 341a) can take various modes.

Further, in the above described embodiment, the example that the decorative member is the extension 340 to which minor finish is applied is described, but the presently disclosed subject matter is not limited to this. For example, the decorative member may be an inner lens or a transparent extension.

The above described embodiments are only illustrations in all respects. The presently disclosed subject matter is not interpreted as limited by the descriptions of the disclosed embodiment and, rather, should include other various embodiments that fall within the scope of the appended claims. The presently disclosed subject matter can be carried out in various forms without departing from the spirit or the main feature of the presently disclosed subject matter. Moreover, while there has been described what are at present considered to be exemplary embodiments of the invention, it will be understood that various modifications may be made thereto, and it is intended that the appended claims cover such modifications as fall within the true spirit and scope of the invention. All conventional art references and their English Abstracts described above are herein incorporated in their entirety by reference.

What is claimed is:
1. A vehicle lighting fitting comprising:
a resin housing including an opening end portion;
a resin lens, an outer peripheral portion of which is laser-welded to the opening end portion to define a lighting chamber; and
a resin decorative member disposed in the lighting chamber, the resin decorative member including an outer peripheral portion on which a joint portion and a non- joint portion are alternately formed along a perimeter of the outer peripheral portion of the resin decorative member, wherein the joint portion of the resin decorative member and the opening end portion of the resin housing are laser-welded in a state in which a clearance is maintained between the non-joint portion of the resin decorative member and the resin housing, and between the resin lens and the resin housing.

2. The vehicle lighting fitting according to claim 1, wherein the non-joint portion is a step portion which is recessed with respect to a side of the lighting chamber.

3. The vehicle lighting fitting according to claim 1, wherein the laser welding is one of laser welding by a laser light from a laser head portion held by a robot arm, and laser welding by a laser light from a galvano scan optical system fixed to a predetermined frame.

4. A method for manufacturing a vehicle lighting fitting by using laser welding, comprising:
providing a resin housing including an opening end portion,
a resin lens having an outer peripheral portion, and
a resin decorative member including a joint portion including a transparent portion and a non-joint portion alternately formed along a perimeter of an outer peripheral portion of the decorative member;
a first holding step of pressing the decorative member including the outer peripheral portion on which the joint portion including the transparent portion and the non-joint portion are alternately formed along a perimeter of the outer peripheral portion, and the housing including the opening end portion, and holding the decorative member and the housing in a state in which a clearance is maintained between the non-joint portion of the decorative member and the housing, and in a state in which the transparent portion of the decorative member and the opening end portion of the housing abut on each other;
a first scanning step of scanning a laser light so that the laser light transmits through the transparent portion of the decorative member, the opening end portion of the housing on which the transparent portion of the decorative member abuts is irradiated with the laser light, and the housing and the decorative member which abuts on the housing are fused and joined;
a second holding step of pressing the lens and the housing, and holding the lens and the housing in a state in which a clearance between the non-joint portion of the decorative member and the lens is maintained, and in a state in which the outer peripheral portion of the lens and the opening end portion of the housing abut on each other; and
a second scanning step of scanning a laser light so that the laser light transmits through the lens, the opening end portion of the housing on which the outer peripheral portion of the lens abuts is irradiated with the laser light, and the housing and the lens which abuts on the housing are fused and joined,
wherein the transparent portion of the decorative member is a thermoplastic resin transparent portion having a transmission property with respect to the laser light,
the lens is a thermoplastic resin lens having a transmission property with respect to the laser light, and
the housing is a thermoplastic resin housing having an absorption property with respect to the laser light.

5. A vehicle lighting fitting comprising:
a resin housing including an opening end portion;
a resin lens, an outer peripheral portion of which is laser-welded to the opening end portion to define a lighting chamber; and
a resin decorative member disposed in the lighting chamber,
wherein a plurality of recessed portions are formed along a perimeter of the opening end portion of the resin housing,
a plurality of claw portions are inserted in the plurality of recessed portions and are formed along a perimeter of the outer peripheral portion of the resin decorative member,
the resin lens includes a plurality of pressing portions configured to press the plurality of claw portions to displace the plurality of claw portions towards an inner side of the lighting chamber,
the plurality of claw portions are configured to be pressed by the plurality of pressing portions to be displaced to the inner side of the lighting chamber and to be pressed against inner peripheral surfaces of the plurality of recessed portions, and
the inner peripheral surfaces of the plurality of recessed portions and the plurality of claw portions which are pressed against the inner peripheral surfaces of the plurality of the recessed portions are laser-welded.

6. The vehicle lighting fitting according to claim 5, wherein the laser welding is one of laser welding by a laser light from a laser head portion held by a robot arm, and laser welding by a laser light from a galvano scan optical system fixed to a predetermined frame.

7. A method for manufacturing a vehicle lighting fitting by using laser welding, comprising:
providing a resin housing including an opening end portion having a plurality of recessed portions formed along a perimeter of the opening end portion of the housing,
a resin lens having an outer peripheral portion and a plurality of pressing portions, and
a resin decorative member including a plurality of transparent claw portions formed along a perimeter of an outer peripheral portion of the decorative member;
inserting the plurality of transparent claw portions formed along the perimeter of the outer peripheral portion of the decorative member into the plurality of recessed portions formed along the perimeter of the opening end portion of the housing;
pressing the housing and the lens including the plurality of pressing portions to press the plurality of claw portions and to displace the plurality of claw portions towards an inner side of the housing, causing the outer peripheral portion of the lens and the opening end portion of the housing to abut onto each other, and pressing the plurality of claw portions by the plurality of pressing portions to displace the plurality of claw portions towards the inner side to press the plurality of claw portions against inner peripheral surfaces of the plurality of recessed portions; and
scanning a laser light so that a laser light transmits through the lens and, the plurality of transparent claw portions, the opening end portion of the housing on which the lens abuts, and the inner peripheral surfaces of the plurality of recessed portions against which the plurality of transparent claw portions are pressed, are irradiated with the laser light, and the opening end portion of the housing and the lens which abuts the opening end portion, and the inner peripheral surfaces of the plurality of recessed portions and the plurality of claw portions which are pressed against the inner peripheral surfaces of the plurality of recessed portions are fused and joined, wherein the plurality of transparent claw portions are thermoplastic resin transparent portions having a transmission property with respect to the laser light, the lens is a thermoplastic resin lens having a transmission property with respect to the laser light, and the housing is a thermoplastic resin housing having an absorption property with respect to the laser light.

8. A vehicle lighting fitting comprising:

a resin housing including an opening end portion;

a resin lens, an outer peripheral portion of which is laser-welded to the opening end portion to define a lighting chamber; and a resin decorative member disposed in the lighting chamber, wherein on an inner side of the opening end portion of the resin housing, a plurality of joint portions are formed along a perimeter of the inner side of the opening end portion, and an outer peripheral portion of the resin decorative member and the plurality of joint portions are laser-welded.

9. The vehicle lighting fitting according to claim 8, wherein the plurality of joint portions are formed at a position which is one step lower with respect to a light emitting axis direction of the vehicle lighting fitting than the opening end portion.

10. The vehicle lighting fitting according to claim 8, wherein on the outer peripheral portion of the resin lens, an annular rib which includes an annular joint surface at a tip end thereof is formed, the annular joint surface of the annular rib of the resin lens and each of the joint portions of the resin housing are laser-welded, and the annular rib of the resin lens is formed into a tapered shape such that a size in front view of the annular rib becomes narrower toward a base end from the tip end.

11. The vehicle lighting fitting according to claim 8, wherein the laser welding is one of laser welding by a laser light from a laser head portion held by a robot arm, and laser welding by a laser light from a galvano scan optical system fixed to a predetermined frame.

12. A method for manufacturing a vehicle lighting fitting by using laser welding, comprising:

providing a housing including an opening end portion and a plurality of joint portions formed along a perimeter and on an inside of the opening end portion of the housing, a lens having an outer peripheral portion, and a decorative member including a transparent portion formed on an outer peripheral portion of the decorative member;

causing the transparent portion formed on the outer peripheral portion of the decorative member, and the plurality of joint portions formed along the perimeter and on the inside of the opening end portion of the housing to abut each other, and holding the outer peripheral portion of the lens and the opening end portion of the housing in a state in which the outer peripheral portion of the lens and the opening end portion of the housing abut each other; and scanning a laser light so that the laser light transmits through the lens and the transparent portion of the decorative member such that, the opening end portion of the housing on which the outer peripheral portion of the lens abuts, and the plurality of joint portions of the housing on which the transparent portion of the decorative member abuts, are irradiated with the laser light, and the opening end portion of the housing and the outer peripheral portion of the lens which abuts the opening end portion, and a plurality of abutting portions of the housing and the transparent portion of the decorative member which abuts on the plurality of abutting portions are fused and joined, wherein the transparent portion of the decorative member is a thermoplastic resin transparent portion having a transmission property with respect to the laser light, the lens is a thermoplastic resin lens having a transmission property with respect to the laser light, and the housing is a thermoplastic resin housing having an absorption property with respect to the laser light.

* * * * *